US011970134B2

(12) United States Patent
Hiruta et al.

(10) Patent No.: US 11,970,134 B2
(45) Date of Patent: Apr. 30, 2024

(54) VEHICLE CONTROL SYSTEM AND APPLICATION EXECUTION DEVICE

(71) Applicant: HONDA MOTOR CO., LTD., Tokyo (JP)

(72) Inventors: Shigenori Hiruta, Wako (JP); Takashi Mori, Wako (JP); Hiroyuki Hayashi, Kawasaki (JP)

(73) Assignee: HONDA MOTOR CO., LTD., Tokyo (JP)

( * ) Notice: Subject to any disclaimer, the term of this patent is extended or adjusted under 35 U.S.C. 154(b) by 517 days.

(21) Appl. No.: 17/277,478

(22) PCT Filed: Sep. 27, 2018

(86) PCT No.: PCT/JP2018/035942
§ 371 (c)(1),
(2) Date: Mar. 18, 2021

(87) PCT Pub. No.: WO2020/065821
PCT Pub. Date: Apr. 2, 2020

(65) Prior Publication Data
US 2021/0347331 A1 Nov. 11, 2021

(51) Int. Cl.
*B60R 25/24* (2013.01)
*B60R 25/20* (2013.01)
*G06F 21/62* (2013.01)

(52) U.S. Cl.
CPC .......... *B60R 25/241* (2013.01); *B60R 25/209* (2013.01); *G06F 21/629* (2013.01)

(58) Field of Classification Search
CPC ... B60R 25/241; B60R 25/209; B60R 16/037; G06F 21/629; G06F 21/121
(Continued)

(56) References Cited

U.S. PATENT DOCUMENTS 6,310,542 B1 * 10/2001 Gehlot .................. B60R 25/252
340/426.25
7,613,551 B2 * 11/2009 Watanabe ........... B60R 25/2036
307/10.6
(Continued)

FOREIGN PATENT DOCUMENTS

JP 2004-238941 8/2004
JP 2004-238941 A 8/2004
(Continued)

OTHER PUBLICATIONS

Japanese Office Action with English translation dated Feb. 15, 2022, 9 pages.
(Continued)

*Primary Examiner* — Jaime Figueroa
(74) *Attorney, Agent, or Firm* — Rankin, Hill & Clark LLP

(57) ABSTRACT

A vehicle control system includes a processing device provided in a vehicle, an application unit (app unit) implemented by execution of an application program by the processing device, a function restriction determining unit determining whether function restriction on the app unit is to be performed based on a used key code, and a function restriction applying unit instructing the app unit to apply a determination result of the determination. The function restriction determining unit determines whether the function restriction on the app unit is to be performed based on a key code of the used electronic key at a plurality of predetermined times, and the function restriction applying unit instructs the app unit to apply the determination result upon activation of the application unit and when a notification of the determination result is received from the function restriction determining unit after the activation.

6 Claims, 10 Drawing Sheets

(58) Field of Classification Search
USPC .............................................................. 701/2
See application file for complete search history.

(56) References Cited

U.S. PATENT DOCUMENTS

| | | | | |
|---|---|---|---|---|
| 8,634,822 B2* | 1/2014 | Silver | ................... | G06N 20/00 |
| | | | | 340/439 |
| 9,031,712 B2* | 5/2015 | Baskin | ............... | G07C 9/00309 |
| | | | | 701/1 |
| 9,189,900 B1* | 11/2015 | Penilla | ................... | B60L 53/80 |
| 9,218,698 B2* | 12/2015 | Ricci | ................... | G06F 16/951 |
| 9,229,905 B1* | 1/2016 | Penilla | ................... | G06Q 20/18 |
| 9,230,379 B2* | 1/2016 | Ricci | ................... | A61B 5/6808 |
| 9,365,188 B1* | 6/2016 | Penilla | ................... | G07F 15/005 |
| 9,499,129 B1* | 11/2016 | Penilla | ................... | B60R 25/241 |
| 9,928,488 B2* | 3/2018 | Penilla | ................... | G06Q 30/08 |
| 10,218,771 B2* | 2/2019 | Penilla | ................... | H04W 4/02 |
| 10,282,708 B2* | 5/2019 | Penilla | ................... | G07C 5/0808 |
| 10,306,053 B1* | 5/2019 | Moeller | ......... | H04M 1/724631 |
| 10,442,399 B2* | 10/2019 | Penilla | ................... | B60L 53/68 |
| 10,652,312 B2* | 5/2020 | Penilla | ................... | G06Q 50/06 |
| 11,132,650 B2* | 9/2021 | Penilla | ................... | G06F 9/00 |
| 11,142,166 B2* | 10/2021 | Arakawa | ............... | G06Q 50/10 |
| 11,479,209 B2* | 10/2022 | Hiruta | ................... | G06F 21/31 |
| 2014/0309813 A1* | 10/2014 | Ricci | ............... | H04N 21/41422 |
| | | | | 701/1 |
| 2014/0309878 A1* | 10/2014 | Ricci | ................... | G06F 9/451 |
| | | | | 701/36 |
| 2014/0309930 A1* | 10/2014 | Ricci | ................... | G01C 21/3697 |
| | | | | 701/431 |
| 2016/0173568 A1* | 6/2016 | Penilla | ................... | G07F 15/005 |
| | | | | 709/217 |
| 2016/0216130 A1* | 7/2016 | Abramson | ......... | G01C 21/3423 |
| 2016/0247377 A1* | 8/2016 | Ricci | ................... | G06V 40/166 |
| 2016/0318481 A1* | 11/2016 | Penilla | ................... | B60L 53/68 |
| 2017/0108935 A1* | 4/2017 | Ricci | ................... | G07C 5/02 |
| 2018/0009416 A1* | 1/2018 | Maiwand | ........... | G07C 9/00309 |
| 2018/0025328 A1* | 1/2018 | Penilla | ............. | G06Q 10/06314 |
| | | | | 705/305 |
| 2018/0134254 A1* | 5/2018 | Penilla | ................... | B60R 25/24 |
| 2018/0186333 A1* | 7/2018 | Santiano | ............... | H04W 12/08 |
| 2018/0211231 A1* | 7/2018 | Penilla | ................... | G06Q 30/08 |
| 2018/0354460 A1* | 12/2018 | Bartels | ............... | G07C 9/00896 |
| 2019/0190980 A1* | 6/2019 | Penilla | ................... | B60L 53/68 |
| 2019/0287080 A1* | 9/2019 | Penilla | ................... | G06F 9/00 |
| 2019/0392107 A1* | 12/2019 | Ricci | ................... | G06F 21/31 |
| 2020/0307516 A1* | 10/2020 | Hiruta | ................... | B60R 25/241 |
| 2020/0361335 A1* | 11/2020 | Penilla | ................... | G06Q 30/00 |
| 2021/0114557 A1* | 4/2021 | Arakawa | ............... | G06F 21/35 |

FOREIGN PATENT DOCUMENTS

| | | |
|---|---|---|
| JP | 2006-178643 | 7/2006 |
| JP | 2007-221324 | 8/2007 |
| JP | 2007-221324 A | 8/2007 |
| JP | 2011-044112 | 3/2011 |
| JP | 2012-203428 | 10/2012 |
| JP | 2015-103058 | 6/2015 |

OTHER PUBLICATIONS

International Preliminary Report on Patentability, International Application No. PCT/JP2018/035942, dated Apr. 8, 2021, 9 pages.
International Search Report, dated Jun. 11, 2018, 2 pages.
Written Opinion of the International Searching Authority dated Nov. 6, 2018 in PCT/JP2018/035942, 5 pages.

* cited by examiner

FIG.4

| USER ID | ELECTRONIC KEY BASIC INFORMATION | RELATIONSHIP INFORMATION | USER ATTRIBUTE | USER TERMINAL INFORMATION |
|---|---|---|---|---|
| Pt-1 | VK001 | FAMILY | SPECIFIED USER | TERM001 |
| Pt-2 | VK002 | FRIEND | UNSPECIFIED USER | TERM002 |
| Pt-3 | VK003 | FRIEND | UNSPECIFIED USER | TERM003 |
| ⋮ | ⋮ | ⋮ | ⋮ | ⋮ | ially available in the vehicle. Since an application
VEHICLE CONTROL SYSTEM AND APPLICATION EXECUTION DEVICE

TECHNICAL FIELD

The present invention relates to a vehicle control system that is mounted in a vehicle and controls operations of an application execution device that exercises various functions by execution of application programs and an application execution device used therefor. In particular, the present invention relates to a vehicle control system that can restrict, in accordance with the current user, a part of functions provided by execution of a specific application by an application execution device in a vehicle used by a plurality of users and an application execution device used therefor.

BACKGROUND ART

Conventionally, a navigation device has been known that, in association with each of a plurality of users, stores and uses personal settings of each of the users (see Patent Literature 1, for example). According to this navigation device, each of users owns a key having a unique key code, and the key code is transmitted from the key to the navigation device for using the navigation device. If the received key code is not stored in a storage device in the navigation device, the navigation device stores the received key code, allocates an individual storage area associated with the key code within the storage device, and saves, in the individual storage area, details set in the navigation device by the user. On the other hand, if the key code received from the key is already stored in the storage device, the navigation device refers to the setting details saved within the individual storage area associated with the key code and provides various functions to the user by using the settings.

By the way, in a case where a plurality of users use a vehicle, an application execution device, such as so-called a display audio or a connectivity audio, that is mounted in the vehicle and provides various functions to the users by executing application programs installed in the vehicle may also be used by the plurality of users. Since an application involving charging such as pay-per-download of a tune or a movie is also executed in such an application execution device, charges of the charging application executed by a friend may be billed to an owner of the vehicle.

Therefore, in using such an application execution device, functions of executed applications are desirably restricted in accordance with the user of the vehicle. However, requiring a special operation such as a key operation upon change of the user as in the conventional technology may cause a circumstance in which the owner who may possibly receive disadvantage has to instruct the changed users not to forget to perform the operation. As a result, when an application execution device as described above is used, it is desirable that a change of the user is automatically identified and that execution of, for example, an application involving charging (therefore, a function provided by the application) is restricted.

CITATION LIST

Patent Literature

Patent Literature 1: Japanese Patent Laid-Open No. 2006-178643

SUMMARY OF INVENTION

Technical Problem

The present invention has been made in view of the background above, and it is an object of the present invention to, in a vehicle used by a plurality of users, enable to restrict, in accordance with the current user, a function provided by execution of an application by an application execution device included in the vehicle without requiring a special operation by the users and without increasing a processing load on an in-vehicle device.

Solution to Problem

One aspect of the present invention is a vehicle control system including a processing device provided in a vehicle which can be used by using each of a plurality of electronic keys, an application unit implemented by execution of an application program by the processing device, a function restriction determining unit determining whether function restriction on the application unit is to be performed or not based on a key code of the electronic key used for the vehicle, and a function restriction applying unit instructing the application unit to apply a determination result in the function restriction determining unit. The function restriction determining unit determines whether the function restriction on the application unit is to be performed or not based on a key code of the used electronic key at a plurality of predetermined times when one of the plurality of electronic keys is used during a period from start of use of the vehicle to end of the use, and the function restriction applying unit instructs the application unit to apply a determination result in the function restriction determining unit upon activation of the application unit or when a notification of the determination result is received from the function restriction determining unit after the activation. According to another aspect of the present invention, upon activation of the application unit, the application unit transmits, to the function restriction applying unit, a notification request that instructs to transmit, to the application unit, an instruction to apply the determination result when the function restriction applying unit receives a notification of the determination result from the function restriction determining unit after activation of the application unit. According to another aspect of the present invention, the function restriction determining unit determines whether the function restriction on the application unit is to be performed or not based on whether a person holding the electronic key used for the vehicle is a specified user including an owner of the vehicle or a person having a predetermined relationship with the owner or an unspecified user other than the specified user. According to another aspect of the present invention, the key code of at least one of the electronic keys includes information indicating whether the person holding the electronic key is the specified user or the unspecified user.

According to another aspect of the present invention, the predetermined times include a time when a door of the vehicle is unlocked by using one of the plurality of electronic keys.

According to another aspect of the present invention, the predetermined times include a time when one of the plurality of electronic keys is used for starting the vehicle.

According to another aspect of the present invention, the function restriction applying unit measures an elapsed time from start of the vehicle and, if a determination result is not received from the function restriction determining unit before the elapsed time passes a predetermined time, instructs the application unit to apply a determination result in the function restriction determining unit received before the start of the vehicle. According to another aspect of the present invention, the application unit instructed to apply the determination result in the function restriction determining unit by the function restriction applying unit includes a content for which charges may be incurred or a content regarding personal information on a specified user including an owner of the vehicle or a person having a predetermined relationship with the owner.

According to another aspect of the present invention, the function restriction applying unit is included in a part of an operating system executed by the processing device, middleware existing between the operating system and the application unit, or a background application executed on the operating system.

Another aspect of the present invention is an application execution device including the processing device and the function restriction applying unit included in the vehicle control system according to any one of the above.

Advantageous Effect of Invention

According to an aspect of the present invention, in a vehicle used by a plurality of users, a function provided by an application execution device included in the vehicle can be restricted in accordance with the current user, without requiring a special operation by the users and without increasing a processing load on an in-vehicle device.

BRIEF DESCRIPTION OF DRAWINGS

FIG. 4 is a diagram showing one example of an electronic key database held by the use management server shown in FIG. 2.

DESCRIPTION OF EMBODIMENT

An embodiment of the present invention is described below with reference to drawings.

1. Configuration of Vehicle Control System 100

Figure 1:
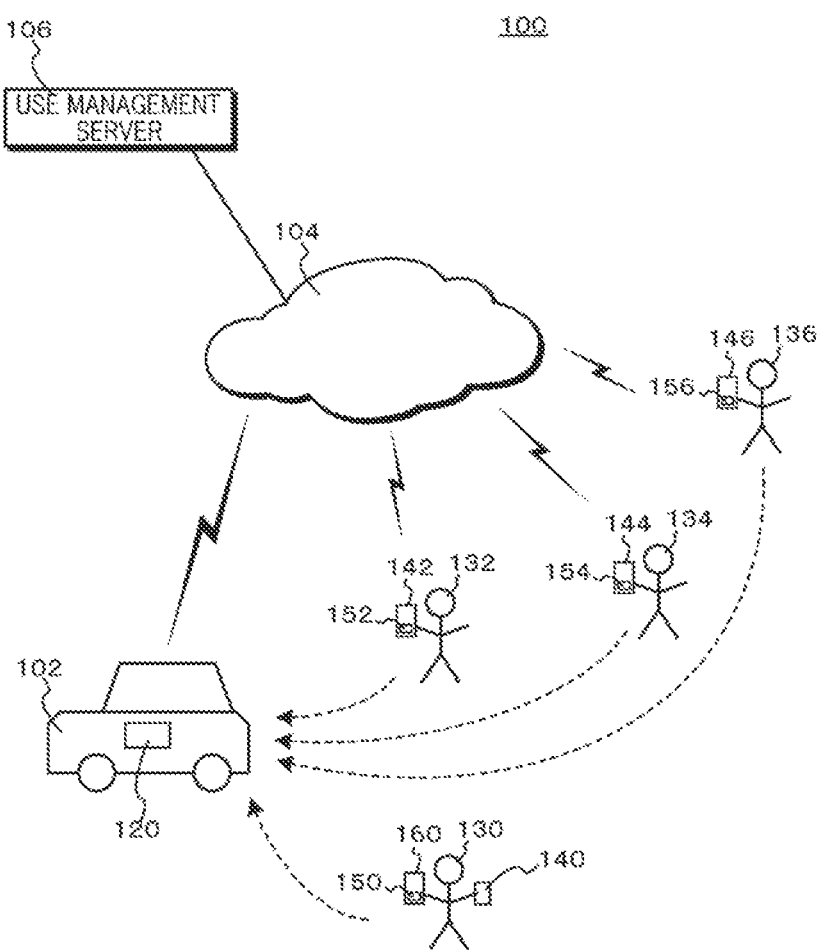
FIG. 1 is a diagram showing a configuration of a vehicle control system according to one embodiment of the present invention.

FIG. 1 is a diagram showing a configuration of a vehicle control system 100 according to the present invention. This vehicle control system 100 (hereinafter, also simply called "system 100") includes a vehicle 102 and a use management server 106 communicably connected to the vehicle 102 via a network 104. The vehicle 102 is, for example, an electric vehicle according to this embodiment. The network 104 is the Internet connected via, for example, a public circuit according to this embodiment.

According to this embodiment, users of the vehicle 102 are categorized into a specified user and an unspecified user. Here, the specified user includes an owner 130 of the vehicle 102 and a person who has a predetermined relationship with the owner 130, and the unspecified user includes persons other than the specified user. The predetermined relationship includes, for example, being a family member, being a relative, being a joint purchaser of the vehicle 102 and the like but is not limited thereto. The predetermined relationship can be one that is defined by, for example, the owner 130 of the vehicle 102, and, for example, belonging to a predetermined organization such as the same company or club may be defined as a predetermined relationship.

According to this embodiment, the vehicle 102 is used by the owner 130 who is the specified user, a family user 132 who is a family member of the owner 130, and guest users 134 and 136. Furthermore, according to this embodiment, the family user 132 is the specified user. The guest users 134 and 136 are the unspecified users who, for example, borrow the vehicle 102 from the owner 130 for use. All of people who use the vehicle 102 are "user", and "user" also includes the owner 130. Therefore, according to this embodiment, it is assumed that the term "user" also includes the owner 130 unless otherwise specified.

Under approval of the owner 130 of the vehicle 102, the use management server 106 generates a unique electronic key including user attribute information indicating a classification of whether the user is the specified user or the unspecified user for a user other than the owner 130 and transmits the generated key to a mobile terminal of the user. It is noted that whether a user other than the owner 130 is the specified user or the unspecified user can be designated by the owner 130 to the use management server 106 or can be determined by the use management server 106 based on information provided by the owner 130.

Thus, the vehicle 102 is used by the owner 130 by using an electronic key 150 stored in an FOB key 160 and is used by the family user 132 and the guest users 134 and 136 by using electronic keys 152, 154 and 156 issued by the use management server 106 and transmitted to mobile terminals 142, 144 and 146, respectively.

It is assumed hereinafter that the terms "electronic key" and "key code" are synonymously used, and, if a key code that is an entity of an electronic key is clearly specified in particular, the term "key code" is used alone or along with the term "electronic key". Also, according to this embodiment, the term "electronic key" refers to an electronic key issued by the use management server 106 as well as the key code 150 of the FOB key 160 owned by the owner 130, unless otherwise specified.

The vehicle 102 includes an in-vehicle system 120. The in-vehicle system 120 includes an application execution device 300 (which is described below) that provides various functions to a user by executing an application program. The application execution device 300 is, for example, so-called a display audio device having an audio playback function or the like. In the system 100 of this embodiment, execution of a part of applications in the application execution device 300 included in the in-vehicle system 120 in the vehicle 102 is restricted (that is, application function restriction is performed) particularly against a user who is the unspecified user.

At a plurality of predetermined times when one of the electronic keys is used during a period from start of use of the vehicle 102 to end of the use, the in-vehicle system 120 in the vehicle 102 performs the application function restriction on the application execution device 300 based on the user attribute information included in a key code of the used electronic key. Here, the expression "start of use of the vehicle 102" refers to unlocking of a door of the vehicle 102 with no passengers when a vehicle start switch 310 (which is described below) for starting the vehicle has an OFF state, and the expression "end of use of the vehicle 102" refers to locking of a door of the vehicle with no passengers when the vehicle start switch 310 has an OFF state.

According to this embodiment, the predetermined times particularly include a time when a door of the vehicle 102 is unlocked with the electronic key of one of the users and a time when the vehicle 102 is started with the electronic key of one of the users. Here, the expression "the vehicle 102 is started" refers to turning on of the operation of a power supply system 312 that supplies power to a driving motor (not shown) that drives wheels of the vehicle 102 being an electric vehicle.

2. Configuration of Use Management Server 106

Figure 2:
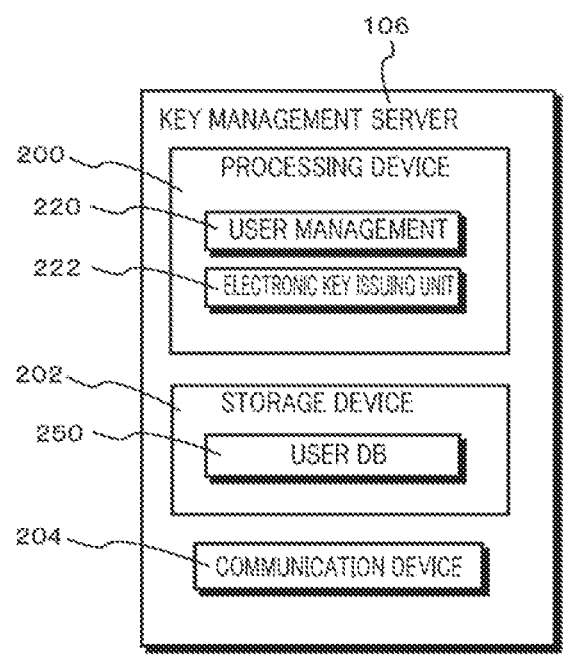
FIG. 2 is a diagram showing a configuration of a use management server in the vehicle control system shown in FIG. 1.

FIG. 2 is a diagram showing a configuration of the use management server 106. The use management server 106 includes a processing device 200, a storage device 202, and a communication device 204. The storage device 202 is configured by, for example, a hard disk device and stores a user DB 250. The communication device 204 is a transmitting/receiving device that performs wired communication and/or wireless communication for connecting the processing device 200 to the network 104.

The processing device 200 is, for example, a computer including a processor such as a central processing unit (CPU). The processing device 200 may be configured to have a read only memory (ROM) in which a program is written, a random access memory (RAM) for temporarily storing data and so on. The processing device 200 includes a user management unit 220 and an electronic key issuing unit 222 as functional elements or functional units.

These functional elements included in the processing device 200 are implemented by execution of a program by the processing device 200 being, for example, a computer. Note that the computer program above can be pre-stored in an arbitrary computer-readable storage medium. Alternatively, all or a part of the functional elements included in the processing device 200 can be each configured by hardware including one or more electronic circuit parts.

2.1 User Management Unit 220

The user management unit 220 receives an electronic key issue request that requests to issue an electronic key to be used for use of the vehicle 102 from a mobile terminal of an applicant who desires to use the vehicle 102 through the communication device 204. In this electronic key issue request, a name or the like of the applicant and user terminal information for accessing the mobile terminal of the applicant by the use management server 106 are included. In response to reception of the electronic key issue request, the user management unit 220 transmits a user registration approval request including the name or the like of the applicant to the mobile terminal 140 of the owner 130. Here, the applicant can transmit the electronic key issue request along with information on a name or the like by which the applicant is identified to the use management server 106 through, for example, a browser for accessing a Website provided by the use management server 106.

If the owner 130 approves the use of the vehicle 102 for the applicant in response to the received user registration approval request, the owner 130 transmits an approval response indicating that the request is approved from the mobile terminal 140 to the use management server 106. At this time, it is assumed that the owner 130 inputs relationship information (such as "family", "relative", "organization A colleague", "friend", or "other") indicating a relationship between the applicant and the owner 130 to the mobile terminal 140. Thus, the approval response indicating the relationship information input by the owner 130 is transmitted to the use management server 106.

If the user management unit 220 receives the approval response indicating that the request is approved from the mobile terminal 140 of the owner 130, the user management unit 220 sets a user attribute "specified user" or "unspecified user" for the applicant based on the relationship information included in the approval response. Here, the user management unit 220 can define a user attribute from the relationship information under a predetermined rule. Also, the user management unit 220 generates a user ID unique to the applicant and unique electronic key basic information. Here, the electronic key basic information includes authentication information to be used for authenticating the electronic key by the vehicle 102.

Then, the user management unit 220 stores the generated user ID and electronic key basic information, the set user attribute and the user terminal information included in the received electronic key issue request in association in the user DB 250 held in the storage device 202. Thus, the user management unit 220 registers the user with the user DB 250.

Also, the user management unit 220 periodically transmits the electronic key basic information stored in the user DB 250 to the vehicle 102.

2.2 User DB 250

FIG. 4 is a diagram showing an example of the user DB 250 generated by the user management unit 220. In the shown example, the user DB 250 has a table format and includes the user ID, the electronic key basic information, the relationship information, the user attribute, and the user terminal information in order from the left column in FIG. 4. Each row of the second and subsequent rows in the shown table has information on each user except for the owner 130. On the second row through the fourth row of the shown table, the user ID, electronic key basic information, relationship information, user attribute and user terminal information regarding, for example, the family user 132 and the guest users 134 and 136, respectively, are shown.

Instead of inputting of the relationship information as described above, the owner 130 may input the classification "specified user" or "unspecified user" directly to the mobile terminal 140 for an applicant indicated in the user registration approval request received from the use management server 106. In this case, the user management unit 220 can receive the approval response along with the classification "specified user" or "unspecified user" input by the owner 130 and set a user attribute of the applicant based on the classification.

2.3 Electronic Key Issuing Unit 222

In response to the registration of the user other than the owner 130 with the user DB 250 by the user management unit 220, the electronic key issuing unit 222 issues an electronic key to the registered user. More specifically, with reference to the user DB 250, the electronic key issuing unit 222 obtains the electronic key basic information, user attribute and user terminal information of the registered user. Then, the electronic key issuing unit 222 generates the electronic key including the obtained electronic key basic information and information on the user attribute and transmits the generated electronic key to the mobile terminal of the user by using the obtained user terminal information.

3. Configuration of In-Vehicle System 120

Figure 3:
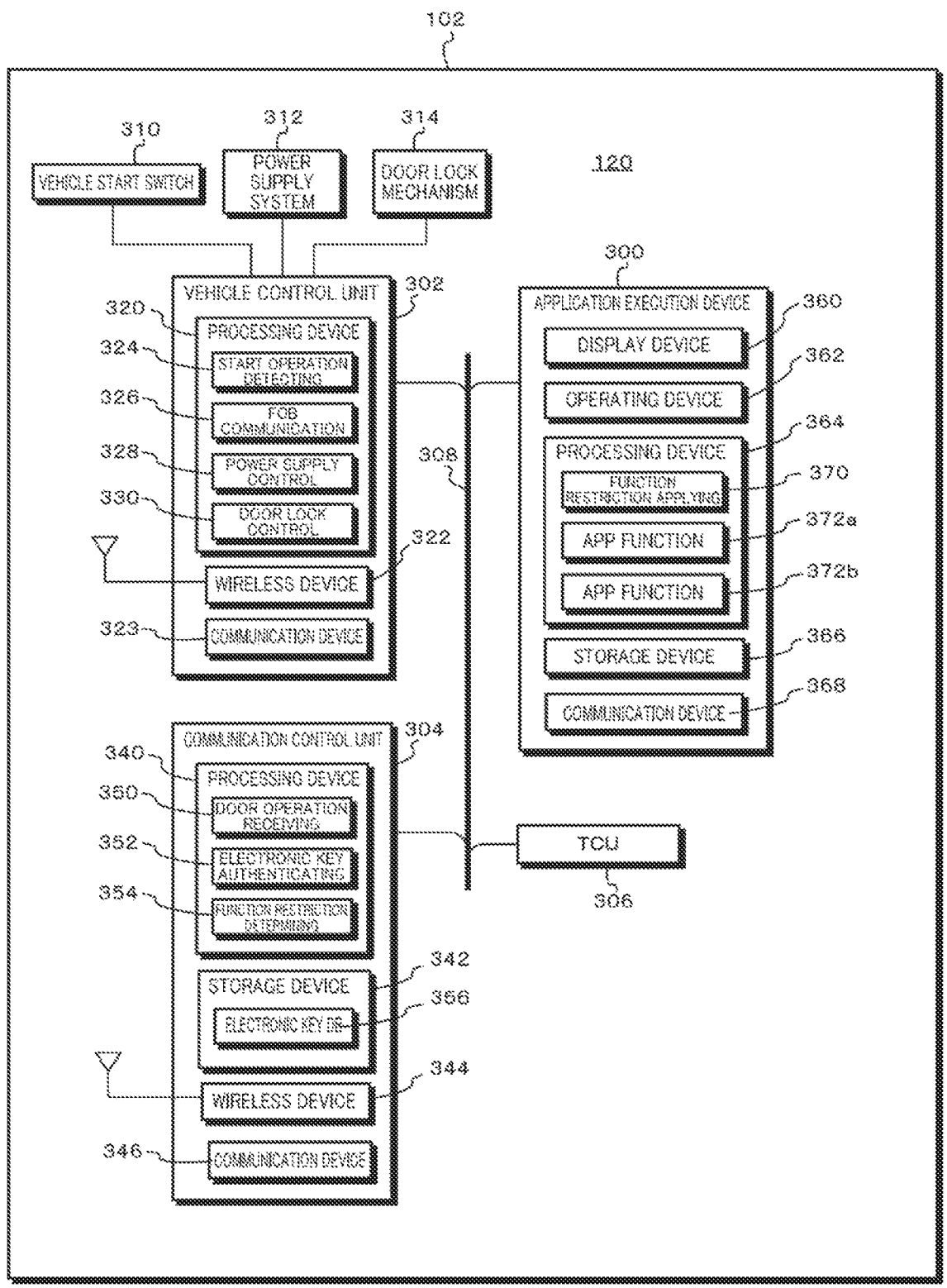
FIG. 3 is a diagram showing a configuration of an in-vehicle system in the vehicle control system shown in FIG. 1.

FIG. 3 is a diagram showing a configuration of the in-vehicle system 120 in the vehicle 102. The in-vehicle system 120 includes the application execution device 300 in which various application programs are executed. According to this embodiment, the application execution device 300 is a so-called display audio (DA) having both of, for example, an audio playback function and an image playback function.

The in-vehicle system 120 further includes a vehicle control unit 302 being an electronic control unit (ECU), a communication control unit 304, and a telemetry control unit (TCU) 306. These application execution device 300, vehicle control unit 302, communication control unit 304 and TCU 306 are communicably connected to each other via an in-vehicle network bus 308. Here, the in-vehicle network bus 308 is, for example, a controller area network (CAN) bus based on the CAN communication standard.

3.1 Vehicle Control Unit 302

The vehicle control unit 302 detects existence of the FOB key 160 by communicating with the FOB key 160. The vehicle control unit 302 further detects an operation of the vehicle start switch 310 and controls the ON/OFF state of the power supply system 312 that supplies power to, for example, a driving motor (not shown) for the vehicle 102. The vehicle control unit 302 further controls an operation of a door lock mechanism 314 that locks/unlocks a door of the vehicle 102.

More specifically, the vehicle control unit 302 includes a processing device 320, a wireless device 322, and a communication device 323. The wireless device 322 is a transmitting/receiving device that performs near-field wireless communication with the FOB key 160. The communication device 323 is, for example, a CAN transceiver for communicating with another device such as the communication control unit 304 via the in-vehicle network bus 308 being, for example, a CAN bus. The processing device 320 is, for example, a computer including a processor such as a CPU. The processing device 320 may be configured to have a ROM in which programs are written, a RAM for temporarily storing data, and so on. The processing device 320 includes a start operation detecting unit 324, an FOB communication unit 326. a power supply control unit 328, and a door lock control unit 330 as functional elements or functional units.

These functional elements included in the processing device 320 are implemented by execution of a program by the processing device 320 being, for example, a computer. The computer program above can be pre-stored in an arbitrary computer-readable storage medium. Alternatively, all or a part of the functional elements included in the processing device 320 can be each configured by hardware including one or more electronic circuit parts.

3.1.1 Start Operation Detecting Unit 324

If the start operation detecting unit 324 detects that the vehicle start switch 310 is turned on, the start operation detecting unit 324 transmits an FOB key detect request to the FOB communication unit 326. If the start operation detecting unit 324 receives an FOB detection notification indicating that the FOB key 160 has been detected from the FOB communication unit 326, the start operation detecting unit 324 transmits a vehicle start request to the power supply control unit 328. If the start operation detecting unit 324 receives a power-on notification from the power supply control unit 328, the start operation detecting unit 324 transmits a vehicle start notification not including a key code to the communication control unit 304.

On the other hand, if the start operation detecting unit 324 receives an FOB non-detection notification indicating that the FOB key 160 has not been detected from the FOB communication unit 326, the start operation detecting unit 324 transmits an electronic key authenticate request to the communication control unit 304. The electronic key authenticate request is transmitted to the communication control unit 304 if the FOB key 160 has not been detected because the wireless device 322 can communicate only with the FOB key 160 and cannot communicate with the mobile terminal 142 or the like. By transmitting the electronic key authenticate request to the communication control unit 304, the start operation detecting unit 324 consigns authentication of a key code that a mobile terminal existing nearby has to the communication control unit 304.

If a mobile terminal exists which has established pairing because the mobile terminal exists nearby and the authentication based on the electronic key basic information included in the key code obtained from the mobile terminal has passed as is described below, the communication control unit 304 returns an electronic key authentication result notification indicating that the electronic key authentication has passed. If the start operation detecting unit 324 receives the electronic key authentication result notification that the electronic key authentication has passed from the communication control unit 304, the start operation detecting unit 324 transmits a vehicle start request to the power supply control unit 328. Then, if the start operation detecting unit 324 receives a power-on notification from the power supply control unit 328, the start operation detecting unit 324 transmits to the communication control unit 304 a vehicle start notification including the key code included in the received electronic key authentication result notification.

If the start operation detecting unit 324 detects that the vehicle start switch 310 has been turned off, the start operation detecting unit 324 transmits a vehicle stop request to the power supply control unit 328. After that, if the start operation detecting unit 324 receives a power-off notification from the power supply control unit 328, the start operation detecting unit 324 transmits a vehicle stop notification to the communication control unit 304.

3.1.2 FOB Communication Unit 326

In response to reception of a door unlock request including the key code 150 from the FOB key 160, the FOB communication unit 326 compares the key code 150 included in the door unlock request with a key code for authentication stored in the FOB communication unit 326. If the key code 150 included in the door unlock request and the stored key code for authentication are matched, the FOB communication unit 326 then transmits a door lock cancel instruction including the key code 150 included in the door unlock request to the door lock control unit 330.

In response to reception of a door lock request including the key code 150 from the FOB key 160, the FOB communication unit 326 compares between the key code 150 included in the door lock request and a key code for authentication stored in the FOB communication unit 326. If the key code 150 included in the door lock request and the stored key code for authentication are matched, the FOB communication unit 326 then transmits a door lock set instruction to the door lock control unit 330.

In response to reception of an FOB key detect request from the start operation detecting unit 324, the FOB communication unit 326 attempts communication with the FOB key 160. If the FOB communication unit 326 can communicate with the FOB 160 and if the key code 150 obtained from the FOB key 160 is matched with the key code for authentication, the FOB communication unit 326 determines that the FOB key 160 has been detected.

If the FOB communication unit 326 detects the FOB key 160, the FOB communication unit 326 transmits an FOB detection notification to the start operation detecting unit 324. If the FOB communication unit 326 does not detect the FOB key 160, the FOB communication unit 326 transmits an FOB non-detection notification to the start operation detecting unit 324.

3.1.3 Power Supply Control Unit 328

If the power supply control unit 328 receives the vehicle start request from the start operation detecting unit 324, the power supply control unit 328 turns on the operation of the power supply system 312. Thus, the power supply system 312 starts power supply to the driving motor (not shown) and so on for the vehicle 102, and the vehicle 102 is started. If the power supply control unit 328 turns on the operation of the power supply system 312, the power supply control unit 328 transmits a power-on notification to the start operation detecting unit 324.

If the power supply control unit 328 receives the vehicle stop request from the start operation detecting unit 324, the power supply control unit 328 turns off the operation of the power supply system 312 and then transmits a power-off notification to the start operation detecting unit 324.

3.1.4 Door Lock Control Unit 330

If the door lock control unit 330 receives the door lock cancel instruction from the FOB communication unit 326 or the communication control unit 304, the door lock control unit 330 causes the door lock mechanism 314 to operate to cancel the door lock. If the door lock is cancelled in accordance with the door lock cancel instruction from the FOB communication unit 326, the door lock control unit 330 transmits a door unlock notification including no key code to the communication control unit 304. On the other hand, if the door lock is cancelled in accordance with the door lock cancel instruction from the communication control unit 304, a door unlock notification including the key code included in the received door lock cancel instruction is transmitted to the communication control unit 304.

If the door lock control unit 330 receives the door lock set instruction from the FOB communication unit 326 or the communication control unit 304, the door lock control unit 330 causes the door lock mechanism 314 to operate to set the door lock (that is, lock the door). If the door lock is set, the door lock control unit 330 transmits a door lock notification to the communication control unit 304.

3.2 Communication Control Unit 304

The communication control unit 304 receives and stores the electronic key basic information of the users excluding the owner 130, which is periodically transmitted by the use management server 106. In response to reception, by a user other than the owner 130 such as the family user 132 or the guest user 134 or 136, of a door lock cancel request from his or her own mobile terminal 142, 144 or 146, the communication control unit 304 authenticates the key code 152, 154 or 156 included in the door lock cancel request based on the periodically received electronic key basic information. If the authentication has passed, the communication control unit 304 instructs the vehicle control unit 302 to cancel the door lock. In response to reception of the electronic key authenticate request from the vehicle control unit 302, the communication control unit 304 obtains a key code from a mobile terminal existing nearby. Then, based on the received electronic key basic information, the obtained key code is authenticated, and an electronic key authentication result notification including a result of the authentication is transmitted to the vehicle control unit 302.

Furthermore, when the communication control unit 304 receives the door unlock notification and receives the vehicle start notification from the vehicle control unit 302, the communication control unit 304 determines whether or not application function restriction is to be performed on the application execution device 300 based on the key code included in the door unlock notification or the vehicle start notification and repeatedly sends out function restriction information that is a result of the determination destined for the application execution device 300 to the in-vehicle network bus 308.

More specifically, the communication control unit 304 includes a processing device 340, a storage device 342, a wireless device 344, and a communication device 346. The storage device 342 is configured by, for example, a non-volatile memory and stores an electronic key DB 356 for saving the electronic key basic information periodically transmitted by the use management server 106. The wireless device 344 is a transmitting/receiving device for performing near-field wireless communication with a mobile terminal existing inside or around the vehicle 102. If there is a mobile terminal existing around the vehicle, the wireless device 344 attempts pairing with it and establishes communication with the mobile terminal. The communication device 346 is, for example, a CAN transceiver for communicating with another device such as the vehicle control unit 302 via the in-vehicle network bus 308 that is, for example, a CAN bus. The processing device 340 is, for example, a computer including a processor such as a CPU. The processing device 340 may be configured to have a ROM in which programs are written, a RAM for temporarily storing data, and so on. The processing device 340 includes a door operation receiving unit 350, an electronic key authenticating unit 352, and a function restriction determining unit 354 as functional elements or functional units.

These functional elements included in the processing device 340 are implemented by execution of a program by the processing device 340 being, for example, a computer. Note that the computer program above can be pre-stored in an arbitrary computer-readable storage medium. Alternatively, all or a part of the functional elements included in the processing device 340 can be each configured by hardware including one or more electronic circuit parts.

3.2.1 Door Operation Receiving Unit 350

In response to reception of a door unlock request including, for example, the key code 152 from, for example, the mobile terminal 142 existing around the vehicle 102, the door operation receiving unit 350 transmits an electronic key authenticate request including the key code included in the door unlock request to the electronic key authenticating unit 352. If the door operation receiving unit 350 receives, from the electronic key authenticating unit 352, an electronic key authentication result notification that the electronic key authentication has passed, the door operation receiving unit 350 transmits a door lock cancel instruction including the key code included in the door unlock request to the vehicle control unit 302 and causes the door lock mechanism 314 to operate to cancel the door lock.

In response to reception of a door lock request including, for example, the key code 152 from, for example, the mobile terminal 142 existing around the vehicle 102, the door operation receiving unit 350 transmits an electronic key authenticate request including the key code included in the door lock request to the electronic key authenticating unit 352. If the door operation receiving unit 350 receives, from the electronic key authenticating unit 352, an electronic key authentication result notification that the electronic key authentication has passed, the door operation receiving unit 350 transmits a door lock set instruction including the key code included in the door lock request to the vehicle control unit 302 and causes the door lock mechanism 314 to operate to lock the door.

3.2.2 Electronic Key Authenticating Unit 352

The electronic key authenticating unit 352 receives the electronic key basic information of the users excluding the owner 130, which is periodically transmitted from the use management server 106, and saves it in the electronic key DB 356 stored in the storage device 342.

If the electronic key authenticating unit 352 receives the electronic key authenticate request from the door operation receiving unit 350, the electronic key authenticating unit 352 authenticates the key code included in the electronic key authenticate request. More specifically, the electronic key authenticating unit 352 extracts the electronic key basic information from the key code included in the received electronic key authenticate request and determines whether or not, in the electronic key basic information saved in the electronic key DB 356 stored in the storage device 342, there is electronic key basic information that is matched with the extracted electronic key basic information. If there is matched information, the electronic key authenticating unit 352 transmits an electronic key authentication result notification indicating that the electronic key authentication has passed to the door operation receiving unit 350. On the other hand, if, in the electronic key basic information saved in the electronic key DB 356, there is no information matched with the extracted electronic key basic information, the electronic key authenticating unit 352 transmits an electronic key authentication result notification indicating that the electronic key authentication has failed to the door operation receiving unit 350.

If the electronic key authenticating unit 352 receives the electronic key authenticate request from the vehicle control unit 302, the electronic key authenticating unit 352 attempts to obtain a key code from a mobile terminal existing nearby. If a key code can be obtained, the key code is authenticated. More specifically, the electronic key authenticating unit 352 extracts the electronic key basic information from the received key code and determines whether or not there is electronic key basic information matched with the extracted electronic key basic information in the electronic key basic information saved in the electronic key DB 356 stored in the storage device 342. If there is matched electronic key basic information, the electronic key authenticating unit 352 transmits, to the vehicle control unit 302, an electronic key authentication result notification that the electronic key authentication has passed including the obtained key code. On the other hand, if there is not electronic key basic information matched with the extracted electronic key basic information in the electronic key basic information saved in the electronic key DB 356, the electronic key authenticating unit 352 transmits an electronic key authentication result notification indicating that the electronic key authentication has failed to the vehicle control unit 302.

3.2.3 Function Restriction Determining Unit 354

If the function restriction determining unit 354 receives the door unlock notification and receives the vehicle start notification from the vehicle control unit 302, the function restriction determining unit 354 executes function restriction determination processing based on each of the received door unlock notification and the vehicle start notification and determines whether or not the application function restriction on the application execution device 300 is to be performed. Here, it is assumed that, with respect to the key code 150 of the FOB key 160, information that the person holding the key code 150 is the specified user (that is, information that the user attribute of the key code 150 is "specified user") is given to the function restriction determining unit 354 in advance.

In the function restriction determination processing, the function restriction determining unit 354 first determines whether or not a key code is included in the received door unlock notification or vehicle start notification. If no key code is included, it is recognized that the key code used for the door unlock or vehicle start relating to the notification is the key code 150 of the FOB key 160. Based on the information that the person holding the key code 150 is the specified user and the recognition that the key code used for the vehicle 102 is the key code 150, the function restriction determining unit 354 generates function restriction information indicating "no function restriction".

On the other hand, if a key code is included in the received door unlock notification or vehicle start notification, the function restriction determining unit 354 extracts the user attribute information from the key code included in the received door unlock notification or vehicle start notification. Then, if the user attribute indicating the extracted user attribute information is "specified user", the function restriction determining unit 354 generates the functional restriction information indicating "no function restriction". On the other hand, if the user attribute indicating the extracted user attribute information is "unspecified user", the function restriction determining unit 354 generates function restriction information indicating "function restriction applied". Here, the function restriction information corresponds to a result (determination result) of the determination, which is performed by the function restriction determining unit 354 based on the key code used for the vehicle 102, on whether function restriction on an application unit 372a (which is described below) is to be performed or not.

As described above, according to this embodiment, except for the case where the key code is the key code 150 of the FOB key 160, the function restriction determining unit 354 in the communication control unit 304 determines whether the person holding the key code used for the door unlock and vehicle start in the vehicle 102 is the specified user or the unspecified user based on the user attribute information included in the key code.

After the function restriction information is generated by the function restriction determination processing, the function restriction determining unit 354 repeatedly outputs a function restriction notification that includes the generated function restriction information and is destined for the application execution device 300 to the in-vehicle network bus 308. Thus, the application execution device 300 can receive the function restriction notification when door unlock and vehicle start are performed on the vehicle 102 and perform application function restriction based on the key code used for each of the door unlock and vehicle start.

If the function restriction determining unit 354 receives the vehicle start notification from the vehicle control unit 302, the function restriction determining unit 354 outputs an update advance notification that is a notification that the function restriction information is to be updated and is destined for the application execution device 300 to the in-vehicle network bus 308 before the function restriction determination processing is executed. After that, based on the key code included in the received vehicle start notification, the function restriction determining unit 354 executes the above-described function restriction determination processing by handling the key code as its target. Then, the function restriction determining unit 354, as described above, repeatedly outputs the function restriction notification that includes the function restriction information generated by the function restriction determination processing and is destined for the application execution device 300 to the in-vehicle network bus 308.

Here, the repeated output of the function restriction notification to the in-vehicle network bus 308 can be performed by, for example, the function restriction determining unit 354 by writing the function restriction notification at predetermined time intervals to a transmission buffer (not shown) in the communication device 346. For example, in a case where the in-vehicle network bus 308 is a network based on CAN standard, the function restriction information is written to the transmission buffer along with a priority level ID that is pre-defined for the function restriction information and is sequentially sent out to the in-vehicle network bus 308 by the communication device 346 at a time determined based on the priority level ID.

3.3 Application Execution Device 300

The application execution device 300 executes various application programs automatically or in accordance with an instruction by a user and provides various functions to the user. The application execution device 300 further receives the function restriction notification output by the communication control unit 304 and notifies the function restriction information included in the received function restriction notification to the applications that are being activated or executed. If an application is the application subject to the function restriction and the notified function restriction information indicates "function restriction applied", the application aborts normal processing of the application.

More specifically, the application execution device 300 includes a display device 360, an operating device 362, a processing device 364, a storage device 366, and a communication device 368. The display device 360 is, for example, a liquid crystal display device, is controlled by the processing device 364 and displays an image and text. The operating device 362 is, for example, a touch panel provided on a display screen of the display device 360 and receives an input operation such as an instruction or data from a user and outputs the information on the input operation to the processing device 364. The communication device 368 is, for example, a CAN transceiver for communicating with another device such as the communication control unit 304 via the in-vehicle network bus 308 that is, for example, a CAN bus.

The storage device 366 is configured by, for example, a volatile and/or nonvolatile semiconductor memory and/or a hard disk device or the like. An application program to be executed by the processing device 364 is stored in the storage device 366, and data required for processing in the processing device 364 are stored therein in advance or as the processing is performed.

The processing device 364 is, for example, a computer including a processor such as a CPU. The processing device 364 may be configured to have a ROM in which programs are written, a RAM for temporarily storing data, and so on. The processing device 364 includes a function restriction applying unit 370 and application units 372a and 372b as functional elements or functional units.

These functional elements included in the processing device 364 are implemented by execution of a program by the processing device 364 being, for example, a computer. Note that the computer program above can be pre-stored in an arbitrary computer-readable storage medium.

The function restriction applying unit 370 can be implemented as a part of an operating system (OS) by execution of the OS program as a basic control program stored in, for example, the storage device 366 by the processing device 364. More specifically, the function restriction applying unit 370 can be implemented by addition of a special API functioning as the function restriction applying unit 370 to a function library including a standard API included in an OS such as Android (registered trademark). Alternatively, the function restriction applying unit 370 can be implemented as being included in middleware existing between an OS and the application units 372a and 372b or being included in a background application executed on an OS.

The application units 372a and 372b are so-called applications that are currently being executed in the processing device 364 and are implemented by execution of the corresponding application programs stored in the storage device 366 on, for example, the OS by the processing device 364. The application units 372a and 372b provide functions described by those application programs to users.

The application programs to be executed by the processing device 364 are categorized into one (function restriction target program) to which the function restriction is applied in accordance with the user attribute of the key code used for the vehicle 102 and one (function restriction non-target program) to be executed irrespective of the user attribute of the key code. According to this embodiment, it is assumed that the application unit 372a is a function restriction target application (hereinafter, "function restriction target app") implemented by the function restriction target program and that the application unit 372b is a function restriction non-target application (hereinafter, "function restriction non-target app") implemented by the function restriction non-target program.

Here, the function restriction target app can be an application including, for example, a content for which charges may be incurred or a content regarding personal information of the specified user. The term "content for which charges may be incurred" refers to a content relating to purchase of an article or a service that requires payment of consideration in, for example, e-commerce or music downloads. The term "content regarding personal information" refers to a content relating to a service that requires transmission of personal information such as address, name, birthday, preference and so on of an individual.

3.3.1 Operations of Function Restriction Applying Unit 370

When the application execution device 300 is powered on and starts execution, the function restriction applying unit 370 that is a part of, for example, the OS first receives and saves in the storage device 366 the function restriction information output from the communication control unit 304 to the in-vehicle network bus 308. If the function restriction applying unit 370 receives a function restriction information request from the application unit 372a, the function restriction applying unit 370 transmits the function restriction information stored in the storage device 366 to the application unit 372a that is the transmission source of the function restriction information request. Here, the transmission of the function restriction information to the application unit 372a by the function restriction applying unit 370 corresponds to instruction to the application unit 372a to apply a determination result (that is, function restriction information) in the function restriction determining unit 354 regarding whether the function restriction is to be performed on the application unit 372a or not.

If the function restriction applying unit 370 receives a notification register request from the application unit 372a, the function restriction applying unit 370 registers the application unit 372a that is the transmission source of the notification register request as a notification destination (communication target) of subsequent function restriction information.

Furthermore, in response to reception of an update advance notification output to the in-vehicle network bus 308 by the communication control unit 304, the function restriction applying unit 370 transmits a restriction update advance notification to the application unit 372a that is the function restriction target app and starts measuring an elapsed time t from the reception of the update advance notification by using a timer (not shown) included in the processing device 364. If the function restriction applying unit 370 receives the function restriction notification output to the in-vehicle network bus 308 by the communication control unit 304 before the elapsed time t passes a predetermined time (such as 3 seconds), the function restriction applying unit 370 updates the function restriction information stored in the storage device 366 with the function restriction information included in the received function restriction notification. The function restriction applying unit 370 then transmits the updated function restriction information to the application unit 372a registered as the notification destination.

On the other hand, if the function restriction applying unit 370 does not receive function restriction information from the in-vehicle network bus 308 before the elapsed time t passes the predetermined time, the function restriction applying unit 370 transmits the function restriction information currently stored in the storage device 366 to the application unit 372a registered as the notification destination, without updating the function restriction information stored in the storage device 366.

3.3.2 Operations of Application Unit 372a

In response to an instruction from a user through the operating device 362 or in response to an instruction given to the OS in advance, the application unit 372a that is the function restriction target app is activated. The application unit 372a after activated transmits a function restriction information request to the function restriction applying unit 370 and obtains function restriction information from the function restriction applying unit 370. At the same time, the application unit 372a that is the function restriction target app transmits to the function restriction applying unit 370 a notification register request that requests to register the application unit 372a as a notification destination (communication target) of subsequent function restriction information. Here, the notification register request corresponds to a notification request that instructs to transmit to the application unit 372a an instruction to apply a determination result (that is, function restriction information) when the function restriction applying unit 370 receives a notification of the determination result (corresponding to the function restriction notification) from the function restriction determining unit 354 after the activation of the application unit 372a.

If the function restriction information received from the function restriction applying unit 370 in response to the function restriction information request indicates "function restriction applied", the application unit 372a aborts execution of normal processing for providing the original function of the application unit 372a. The application unit 372a then displays on the display device 360 a function restriction message such as "This application is under restriction" indicating that the function is restricted. On the other hand, if the function restriction information obtained from the function restriction applying unit 370 upon activation indicates "no function restriction", the application unit 372a continues execution of the normal processing and provides the original function of the application unit 372a to the user.

If the application unit 372a receives the restriction update advance notification from the function restriction applying unit 370, the application unit 372a displays a wait message such as "Please wait for a while" on the display device 360. At that time, if normal processing is being executed, the application unit 372a aborts the execution of the normal processing.

If the application unit 372a receives the function restriction information from the function restriction applying unit 370 after receiving the update advance notification, the application unit 372a performs the display of the function restriction message or the execution of normal processing in accordance with the received function restriction information. In other words, if the received function restriction information indicates "function restriction applied", the application unit 372*a* displays the function restriction message on the display device 360 and aborts normal processing if the normal processing is being executed or continues the abort of the execution of normal processing if the execution of the normal processing has been already aborted. On the other hand, if the received function restriction information indicates "no function restriction", the application unit 372*a* continues execution of normal processing if the normal processing is being executed and closes the display of the function restriction message if it is being displayed and starts normal processing.

3.3.3 Operations of Application Unit 372*b*

The application unit 372*b* that is a function restriction non-target app starts execution of normal processing on the OS immediately after activation of the application unit 372*b* in accordance with a conventional technology without requesting function restriction information to the function restriction applying unit 370.

4. Effects of Vehicle Control System 100

The vehicle control system 100 having the above-described configuration performs the function restriction on an application in the application execution device 300 included within the vehicle 102 in accordance with a user attribute associated with an electronic key used for door unlock or vehicle start of the vehicle 102. Therefore, in the system 100, functions to be provided to a user by the application execution device 300 through execution of the application can be automatically restricted in accordance with the current user of the vehicle 102 without requiring a special key operation by the user and without causing an increase of a processing load on an in-vehicle device such as the application execution device 300, the vehicle control unit 302 and the communication control unit 304. Also, in the vehicle control system 100, because the application restriction is performed in accordance with two user attributes of "specified user" and "unspecified user", the application restriction function can be implemented only by providing a minimum storage device. Therefore, the cost caused by the addition of the application restriction function can be reduced.

Generally, in a case of an internal combustion vehicle that drives wheels by using an internal combustion engine only, even when electric equipment such as the application execution device that is, for example, a display audio is powered on before start of the internal combustion engine, the electric equipment is automatically powered off once and then is powered on upon start of the internal combustion engine (that is, upon vehicle start) to secure power supply to the motor to be used for cranking. Therefore, in the internal combustion vehicle, by determining an attribute of an electronic key of a vehicle user and deciding the necessity of the application function restriction only when the application execution device is powered on, proper application restriction according to the vehicle user can be performed.

On the other hand, in a case where the vehicle 102 is an electric vehicle as in this embodiment, the application execution device 300 powered on before start of power supply to a motor for wheel driving (that is, vehicle start) is generally kept in the power-on state even upon vehicle start. Thus, if a user attribute of an electronic key of the vehicle user is determined and the necessity of the application function restriction is decided only when the application execution device 300 is powered on, a case where proper application restriction according to the current vehicle user cannot be performed may occur when the vehicle user is changed during a period from unlock of a vehicle door to the vehicle start. Such a change of the vehicle user may occur, for example, when the guest user 134 who is the unspecified user performs door unlock of the vehicle 102 by using an electronic key and the owner 130 then performs the vehicle start by using the FOB key 160.

On the other hand, in the vehicle control system 100, upon door unlock of the vehicle 102 and upon vehicle start of the vehicle 102, the necessity of the application function restriction in the application execution device 300 is determined based on a user attribute of an electronic key used for the door unlock and the vehicle start. Thus, in the system 100, even when the user of the vehicle 102 is changed during a period from the door unlock to the vehicle start, proper application function restriction according to the current user can be performed.

Also, in the vehicle control system 100 of this embodiment, if the function restriction determining unit 354 does not receive new function restriction information from the communication control unit 304 before passage of a predetermined period of time from the update advance notification after vehicle start, the state of the application function restriction based on the function restriction information that is received last time (that is, according to the user having a key code used last time) is continued. Thus, in the system 100, a sense of discomfort of the user because of delayed reflection of the application restriction according to the current user after the vehicle start can be avoided.

Such delay of reception of the function restriction information may occur in a case where output of function restriction information of low priority is held for a relatively long time in a special circumstance where, for example, communication of information of higher priority occurs at a high frequency on the in-vehicle network bus 308 due to some abnormality handling upon start of the vehicle. In this case, as an abnormality handling operation, the owner 130, for example, who is the current user and the specified user can cancel the state of the application function restriction set upon the last door unlock by re-activating the application unit 372*a* after a while from the vehicle start. This is because, as described above, the activated application unit 372*a* transmits a function restriction information request to the function restriction applying unit 370 upon activation, obtains new function restriction information and performs function restriction based on the obtained function restriction information.

5. Processing in Vehicle Control System 100

Next, processing relating to the application function restriction in the function restriction determining unit 354 in the communication control unit 304 and the application execution device 300 is described.

5.1 Processing in Communication Control Unit 304

First, processing relating to the application function restriction in the function restriction determining unit 354 in the communication control unit 304 is described with reference to a flowchart shown in FIG. 5. This processing starts when the communication control unit 304 is powered on and ends when the communication control unit 304 is powered off. The communication control unit 304 is powered on, for example, upon factory shipment of the vehicle 102, and the power-on state is maintained even while the operation of the power supply system 312 of the vehicle 102 does not have an ON state.

Figure 5:
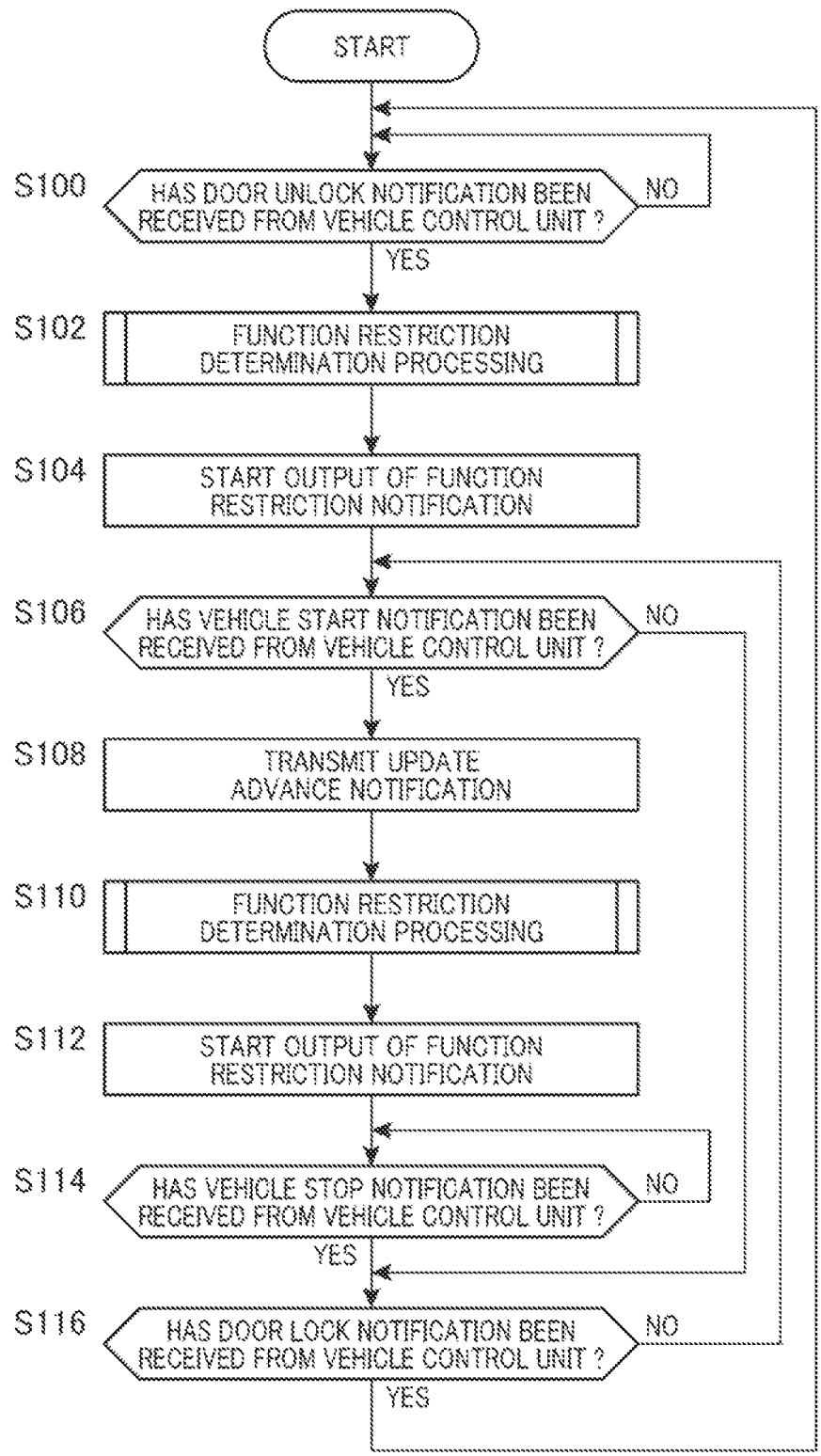
FIG. 5 is a flowchart showing a procedure of processing related to application function restriction in a communication control unit shown in FIG. 3.

Referring to FIG. 5, when processing starts, the function restriction determining unit 354 in the communication control unit 304 first determines whether a door unlock notification including a key code has been received from the vehicle control unit 302 or not (S100). If the door unlock notification has not been received from the vehicle control unit 302 (NO in S100), the processing returns to step S100 and is repeated. On the other hand, if the door unlock notification has been received from the vehicle control unit 302 (YES in S100), the function restriction determining unit 354 executes function restriction determination processing by handling the received door unlock notification as a "processing target" (S102).

Figure 6:
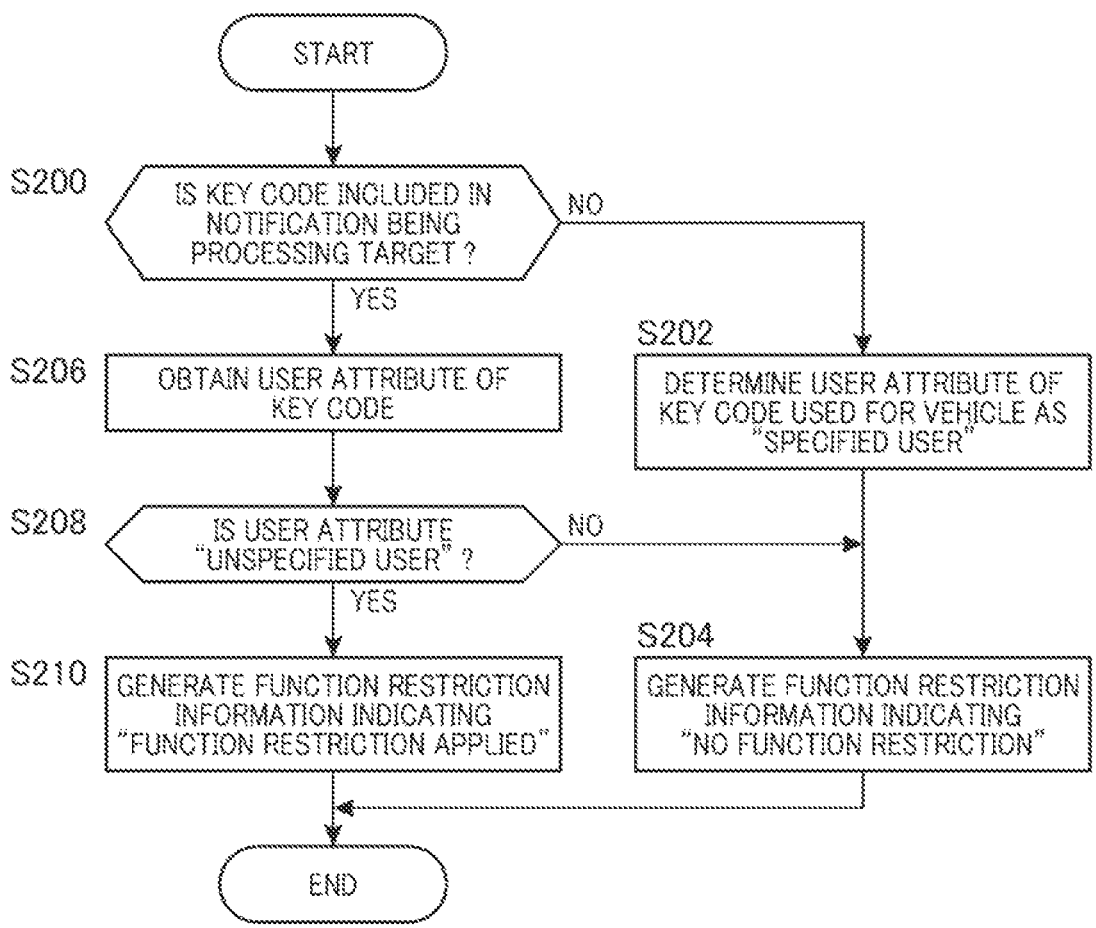
FIG. 6 is a flowchart showing a procedure of function restriction determination processing in the flowchart shown in FIG. 5.

FIG. 6 is a flowchart showing a procedure of the function restriction determination processing. In the function restriction determination processing, the function restriction determining unit 354 first determines whether a key code is included in the notification handled as the processing target or not (S200). If no key code is included (NO in S202), it is determined that the key code 150 having the user attribute "specified user" has been used (S202), function restriction information of "no function restriction" is generated (S204), and the function restriction determination processing ends.

If a key code is included in the notification handled as the processing target in step S200 (YES in S200), the function restriction determining unit 354 extracts user attribute information from the key code and obtains a user attribute (S206). Next, the function restriction determining unit 354 determines whether the obtained user attribute is "unspecified user" or not (S208). If the user attribute is "unspecified user" (YES in S208), the function restriction determining unit 354 generates function restriction information indicating "function restriction applied" (S210) and ends the function restriction determination processing. On the other hand, if the obtained user attribute is "specified user" (NO in S208), the function restriction determining unit 354 moves the processing to step S204 where function restriction information indicating "no function restriction" is generated and ends the processing.

Referring back to FIG. 5, after the function restriction determination processing is executed in step S102, the function restriction determining unit 354 starts output, to the communication device 346, of a function restriction notification including the function restriction information generated in the function restriction determination processing (S104) and repeatedly outputs the function restriction notification to the communication device 346. Each of the output function restriction notifications are saved in, for example, a transmission buffer (not shown) in the communication device 346 and is output to the in-vehicle network bus 308 by the communication device 346 at a proper time based on the priority level ID given to the function restriction notification.

Next, the function restriction determining unit 354 determines whether a vehicle start notification including a key code has been received from the vehicle control unit 302 or not (S106). If a vehicle start notification has been received from the vehicle control unit 302 (YES in S106), the function restriction determining unit 354 outputs an update advance notification to the communication device 346 (S108). The output update advance notification is saved in, for example, the transmission buffer in the communication device 346 and is output to the in-vehicle network bus 308 at a proper time from the communication device 346. The priority level ID of the update advance notification is desirably set to have a priority level at least equal to or higher than the function restriction notification such that the update advance notification is transmitted to the in-vehicle network bus within a predetermined period of time from the saving in the transmission buffer even when the communication frequency of information with higher priority levels is high in the in-vehicle network bus 308.

Next, the function restriction determining unit 354 executes the function restriction determination processing shown in FIG. 5 by handling the key code included in the received vehicle start notification as a target (S110), starts output to the communication device 346 of a function restriction notification including the function restriction information generated by the function restriction determination processing (S112) and repeatedly outputs the function restriction notification to the communication device 346. Each of the output function restriction notifications is saved in, for example, the transmission buffer (not shown) in the communication device 346 and is output to the in-vehicle network bus 308 by the communication device 346 at a proper time based on the priority level ID given to the function restriction notification, like the output of the function restriction information in step S110.

Thus, the function restriction information is updated based on the key code used for the vehicle start of the vehicle 102, and a function restriction notification including the updated function restriction information is output to the in-vehicle network bus 308. Then, by performing processing, which is described below, by the application execution device 300 having received the output function restriction notification, the application function restriction according to the current user is performed.

Next, the function restriction determining unit 354 determines whether a vehicle stop notification has been received from the vehicle control unit 302 or not (S114), and, if the vehicle stop notification has not been received (NO in S114), the function restriction determining unit 354 returns the processing to step S114 and waits for reception of the vehicle stop notification.

On the other hand, if the vehicle stop notification has been received from the vehicle control unit 302 in step S114 (YES in S114), the function restriction determining unit 354 determines whether a door lock notification has been received from the vehicle control unit 302 or not (S116). If the door lock notification has not been received from the vehicle control unit 302 (NO in S116), the door operation receiving unit 350 returns the processing to step S106.

On the other hand, if the door lock notification has been received from the vehicle control unit 302 (YES in S116), that is, if the vehicle 102 is not started and the door is locked, the function restriction determining unit 354 determines that the use of the vehicle 102 has been finished, returns the processing to step S100 and waits for the next vehicle use.

5.2 Processing in Application Execution Device 300

Next, processing related to application function restriction in the application execution device 300 is described. This processing includes processing in the function restriction applying unit 370 implemented as, for example, a part of the OS and processing in the application unit 372*a* that is the function restriction target app.

5.2.1 Processing in Function Restriction Applying Unit 370

Figure 7:
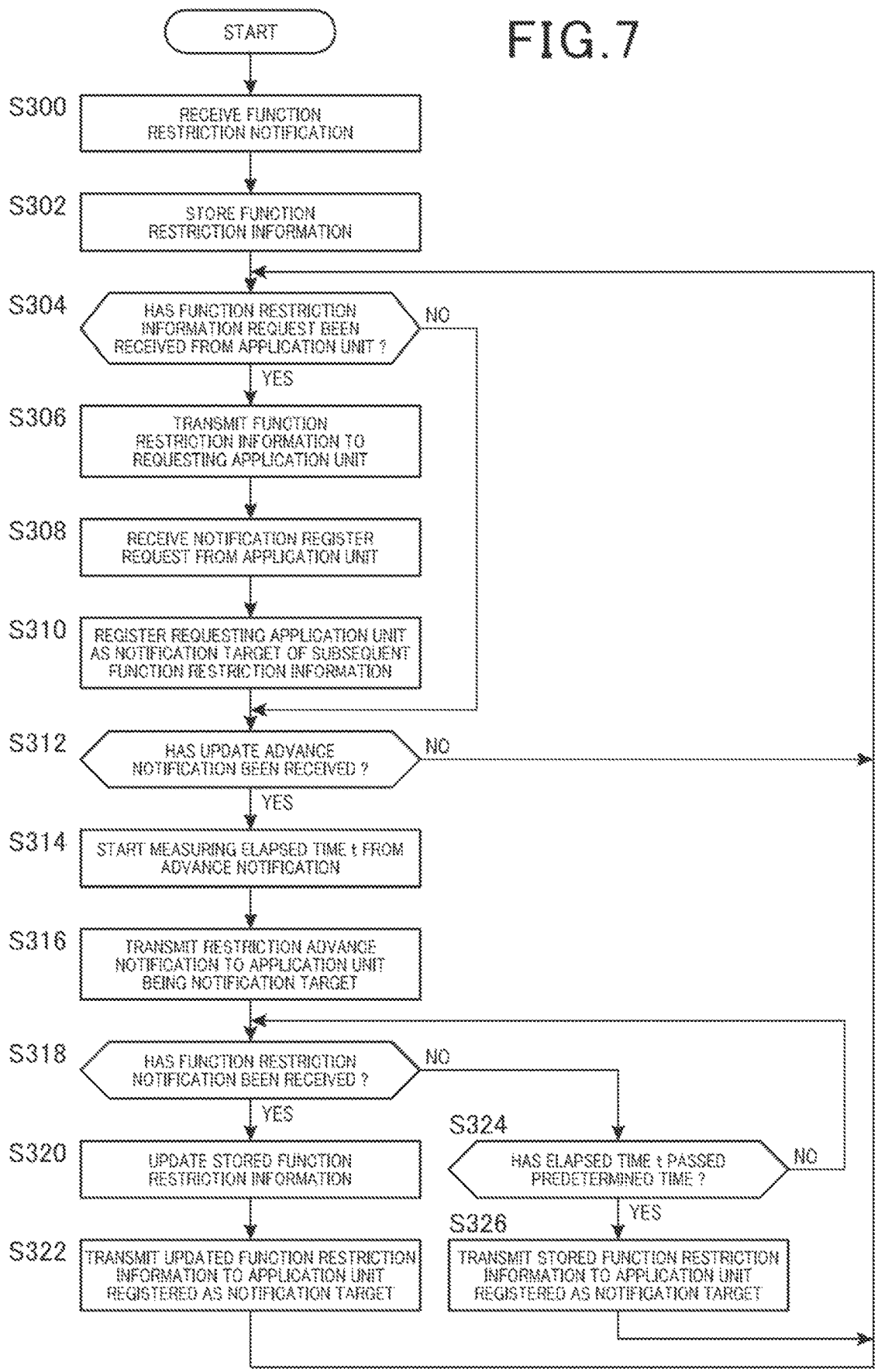
FIG. 7 is a flowchart showing a procedure of processing related to the application function restriction in a function restriction applying unit in an application execution device shown in FIG. 3.

First, the processing related to the application function restriction in the function restriction applying unit 370 is described with reference to a flowchart shown in FIG. 7. This processing starts when the application execution device 300 is powered on and execution of the OS program is started in the processing device 364 and ends when the execution of the OS program ends. Note that, according to this embodiment, because the function restriction target app being executed in the application execution device 300 is only the application unit 372a, the function restriction applying unit 370 performs this processing related to the application function restriction only on the application unit 372a as is described below. However, a plurality of function restriction target apps can be executed in parallel in the application execution device 300, and, in this case, the function restriction applying unit 370 can perform the following processing on each of those plurality of function restriction target apps executed in parallel.

When the processing starts, the function restriction applying unit 370 first receives the function restriction notification output by the communication control unit 304 from the in-vehicle network bus 308 (S300) and stores in the storage device 366 the function restriction information included in the received function restriction notification (S302). Next, the function restriction applying unit 370 determines whether a function restriction information request has been received from the application unit 372a that is the function restriction target app or not (S304). If the function restriction information request has not been received from the application unit 372a (YES in S304), the function restriction applying unit 370 moves the processing to step S312, which is described below, where it is determined whether an update advance notification output by the communication control unit 304 has been received or not.

On the other hand, if the function restriction information request has been received from the application unit 372a (YES in S304), the function restriction applying unit 370 transmits the function restriction information stored in the storage device 366 to the application unit 372a that is a transmission source of the function restriction information request (S306). In response to reception of a notification register request from the application unit 372a (S308), the function restriction applying unit 370 stores in the storage device 366 and registers the application unit 372a that is the transmission source of the notification register request as a notification target of the subsequent function restriction information (S310).

Next, the function restriction applying unit 370 determines whether the update advance notification output by the communication control unit 304 has been received from the in-vehicle network bus 308 or not (S312). If the update advance notification has been received (YES in S312), measurement of the elapsed time t after the update advance notification is received is started (S314), and a restriction update advance notification is transmitted to the application unit 372a registered as the notification target in step S310 (S316).

Next, the function restriction applying unit 370 determines whether a function restriction notification output by the communication control unit 304 has been received from the in-vehicle network bus 308 or not (S318). If the function restriction notification has been received (YES in S318), the function restriction applying unit 370 updates the function restriction information stored in the storage device 366 with the function restriction information included in the received function restriction notification (S320).

Next, the function restriction applying unit 370 transmits the updated function restriction information to the application unit 372a registered as the notification target in step S310 (S322) and then returns the processing to step S300 and repeats the processing.

On the other hand, if the function restriction information has not been received in step S318 (NO in S318), the function restriction applying unit 370 determines whether the elapsed time t has passed a predetermined time or not (S324). If the elapsed time t has not passed the predetermined time (NO in S324), the function restriction applying unit 370 returns the processing to step S318 and waits for reception of the function restriction information. On the other hand, if the elapsed time t has passed the predetermined time (YES in S324), the function restriction applying unit 370 transmits the function restriction information currently stored in the storage device 366 to the application unit 372a registered as the notification target (S326) without updating the function restriction information stored in the storage device 366 and then returns the processing to step S300 and repeats the processing.

5.2.2 Processing in Application Unit 372a

Figure 8:
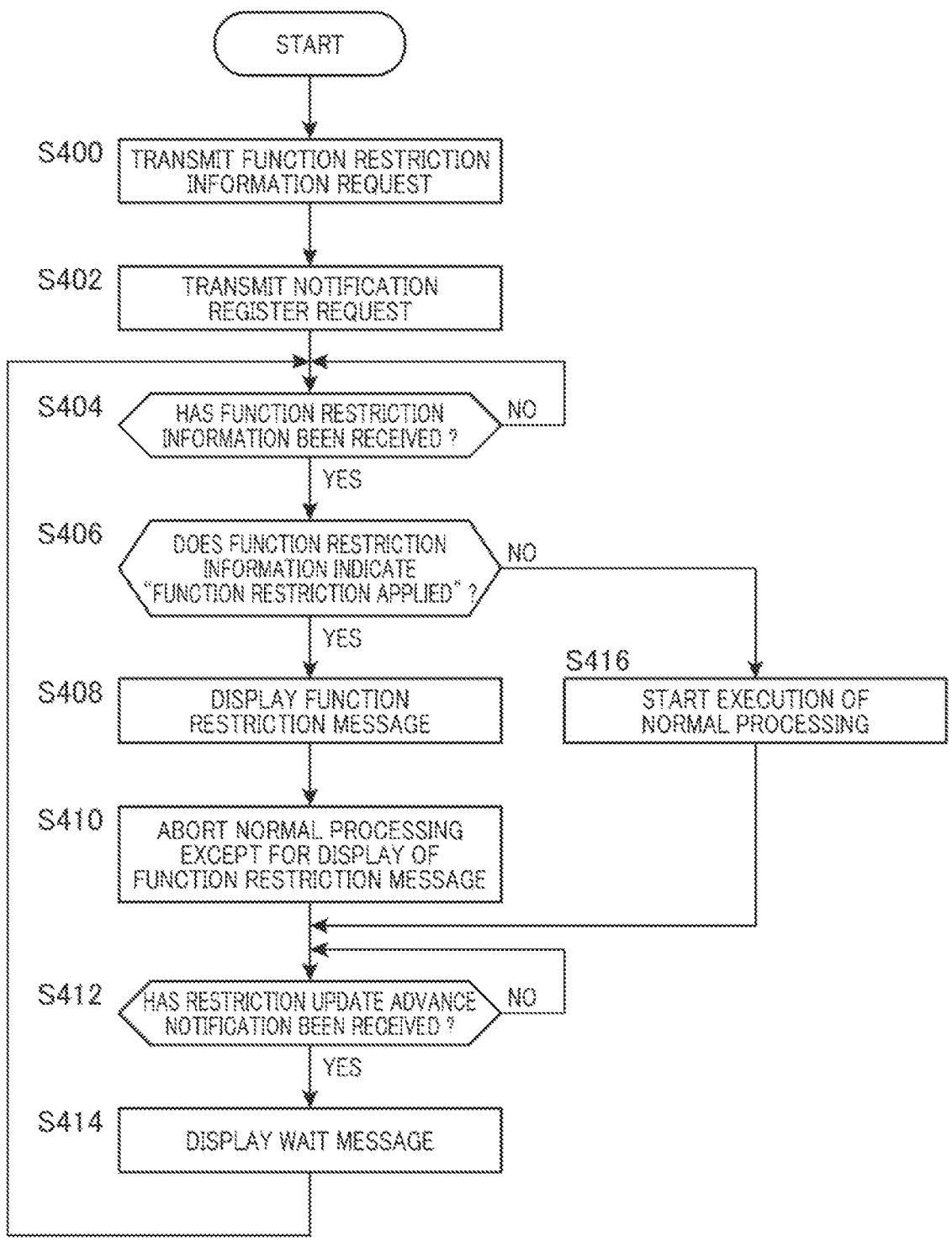
FIG. 8 is a flowchart showing a procedure of processing related to the application function restriction in an application unit in the application execution device shown in FIG. 3.

Next, processing related to application function restriction in the application unit 372a that is the function restriction target app is described with reference to a flowchart shown in FIG. 8. This processing starts operating in the application unit 372a when the application unit 372a that is the function restriction target app is activated in response to, for example, a user operation on the operating device 362 in the application execution device 300 or an instruction given in advance to the OS program executed by the processing device 364 in the application execution device 300. Note that, in a case where a plurality of application units that are the function restriction target apps are executed in parallel in the application execution device 300, this processing is executed in each of those application units executed in parallel.

When the processing starts, the application unit 372a transmits a function restriction information request to the function restriction applying unit 370 (S400) and transmits a notification register request to the function restriction applying unit 370 (S402). Next, the application unit 372a determines whether the function restriction information transmitted by the function restriction applying unit 370 in response to the function restriction information request has been received or not (S404). If the function restriction information has not been received, the application unit 372a returns the processing to step S404 and waits for reception of the function restriction information.

On the other hand, if the function restriction information has been received (YES in S404), the application unit 372a determines whether the received function restriction information indicates "function restriction applied" or not (S406). If the received function restriction information indicates "function restriction applied" (YES in S406), the application unit 372a displays the function restriction message on the display device 360 (S408) and aborts execution of normal processing for providing the original function of the application unit 372a excluding the display of the function restriction message (S410).

After that, the application unit 372a determines whether a restriction update advance notification has been received or not (S412), and, if the restriction update advance notification has not been received, the processing returns to step S412 and waits for reception of the restriction update advance notification. On the other hand, if the restriction update advance notification has been received (YES in S412), the application unit 372a displays the wait message on the display device 360 (S414), and the processing then returns to step S404 and waits for reception of the function restriction information.

On the other hand, if the obtained function restriction information indicates "no function restriction" in step S406 (NO in S406), the application unit 372a starts execution of normal processing (S416), and the processing then moves to step S412 and waits for reception of the restriction update advance notification.

6. Operation Examples of Vehicle Control System 100

Next, two examples in a case where a user who performs door unlock on the vehicle 102 and a user who performs vehicle start are different are described as operation examples of the vehicle control system 100.

6.1 First Example

A first operation example of the vehicle control system 100 is described with reference to a sequence diagram shown in FIG. 9. In this example, first of all, the guest user 134 to whom a user ID "Pt-3" is given in the user DB 250 shown in FIG. 4 unlocks a door of the vehicle 102 by using a key code 154 ("VK003") stored in the mobile terminal 144. After the guest user 134 then powers on the application execution device 300 and activates the application unit 372a that is the function restriction target app, the owner 130 who is the specified user performs vehicle start by using the FOB key 160.

Figure 9:
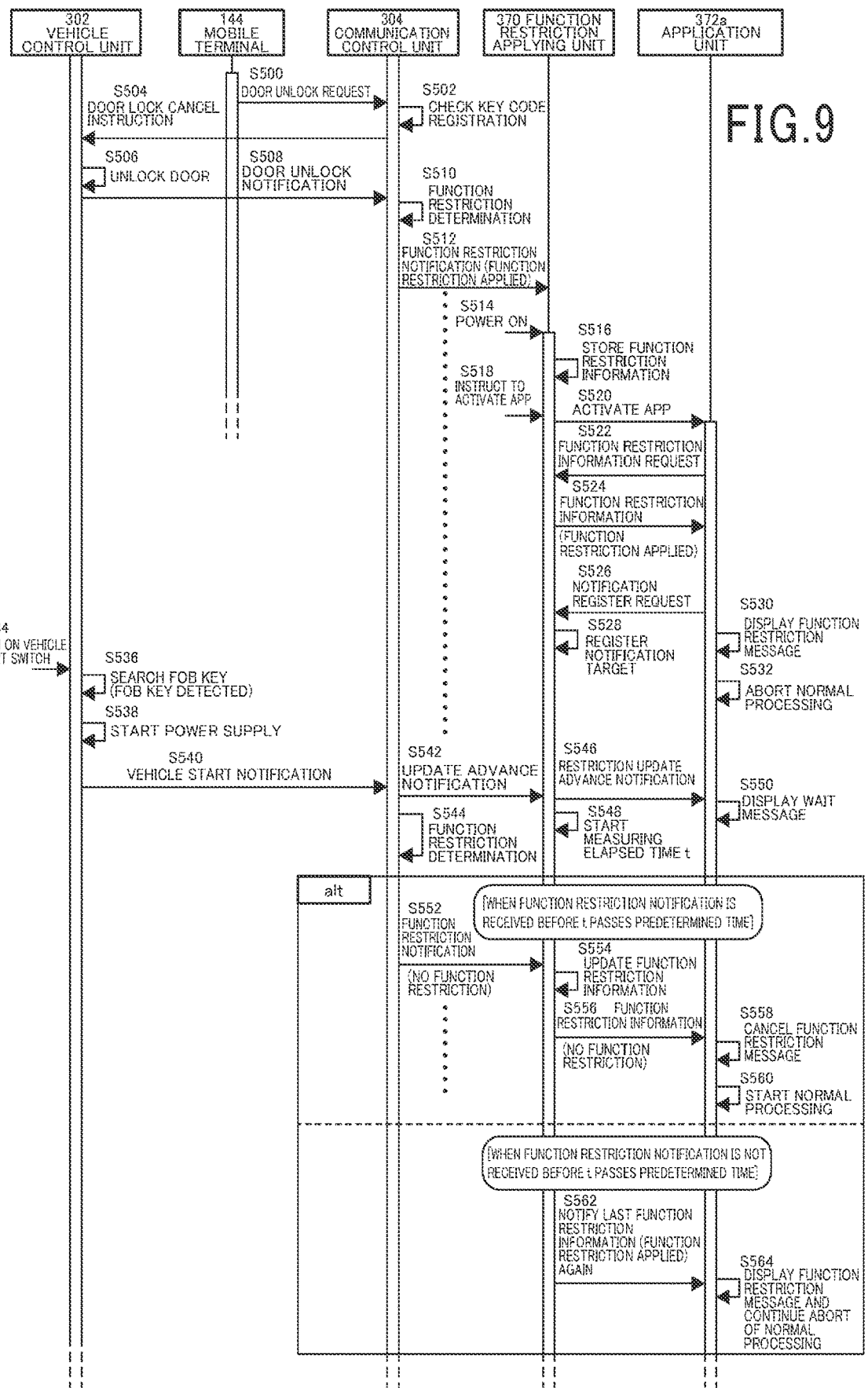
FIG. 9 is a sequence diagram showing a first example of operations in the vehicle control system shown in FIG. 1.

FIG. 9 shows, as objects, the vehicle control unit 302, the mobile terminal 144 of the guest user 134, the communication control unit 304, the function restriction applying unit 370 in the application execution device 300, and the application unit 372a that is the function restriction target app. The vehicle control unit 302 and the communication control unit 304 have already been powered on.

First, when the guest user 134 stands in front of a door of the vehicle 102 and transmits a door unlock request from the mobile terminal 144 (S500), the communication control unit 304 checks, by using the electronic key authenticating unit 352, that the key code 154 included in the door unlock request has been registered (S502) and transmits a door lock cancel instruction to the vehicle control unit 302 by using the door operation receiving unit 350 (S504).

The vehicle control unit 302 unlocks the door by using the door lock control unit 330 (S506) and transmits a door unlock notification to the communication control unit 304 (S508). The communication control unit 304 performs function restriction determination by using the function restriction determining unit 354 by handling the door unlock notification as a target (S510). The function restriction determining unit 354 identifies that the user attribute is "unspecified user" from user attribute information of the key code 154 included in the door unlock notification and generates function restriction information indicating "function restriction applied".

Next, the function restriction determining unit 354 in the communication control unit 304 repeatedly outputs a function restriction notification including the generated function restriction information to the communication device 346. Thus, the function restriction notification is output to the in-vehicle network bus 308 through the communication device 346 (S512). Note that the shown dotted line indicates that the function restriction notification is repeatedly output.

After that, if the application execution device 300 is powered on (S514), the function restriction applying unit 370 in the application execution device 300 starts operating. After the start of operating, the function restriction applying unit 370 receives the function restriction notification repeatedly output by the communication control unit 304 to the in-vehicle network bus 308 and stores, in the storage device 366, the function restriction information included in the received function restriction notification (S516).

Further after that, if, for example, the guest user 134 gives an instruction to activate the application unit 372a to the operating device 362 in the application execution device 300 (S518), the application unit 372a that is the function restriction target app is activated (S520). The activated application unit 372a transmits a function restriction information request to the function restriction applying unit 370 (S522), and the function restriction applying unit 370 transmits the function restriction information stored in the storage device 366 to the application unit 372a (S524). The application unit 372a transmits to the function restriction applying unit 370 a notification register request that requests to register the application unit 372a as a notification target of the function restriction information updated thereafter (S526), and the function restriction applying unit 370 registers the application unit 372a as a notification target (S528).

Next, in response to reception of the function restriction information indicating "function restriction applied" transmitted in sequence S524, the application unit 372a displays the function restriction message on the display device 360 (S530) and aborts execution of normal processing (S532).

After that, if the owner 130 holding the FOB key 160 gets into the vehicle 102 and turns on the vehicle start switch 310 (S534), the start operation detecting unit 324 in the vehicle control unit 302 performs a search for the FOB key 160 and detects the FOB key 160 (S536). Thus, the power supply control unit 328 in the vehicle control unit 302 turns on the power supply system 312 and starts power supply (S538), and the start operation detecting unit 324 transmits a vehicle start notification to the communication control unit 304 (S540).

In response to reception of the vehicle start notification, the function restriction determining unit 354 in the communication control unit 304 transmits an update advance notification to the application execution device 300 (S542) and starts the function restriction determination processing by handling the received vehicle start notification as a target (S544). In response to reception of the update advance notification from the communication control unit 304, the function restriction applying unit 370 in the application execution device 300 transmits a restriction update advance notification to the application unit 372a registered as the notification target in sequence S530 (S546) and starts measuring the elapsed time t from the reception of the update advance notification (S548). In response to reception of the restriction update advance notification, the application unit 372a displays the wait message, which is changed from the function restriction message, on the display device 360 (S550).

Then, before the elapsed time t passes a predetermined time, the communication control unit 304 sends out, to the in-vehicle network bus 308, a function restriction notification including the new function restriction information by using the function restriction determining unit 354 (S552), and, when the function restriction applying unit 370 receives this, the function restriction applying unit 370 updates the function restriction information stored in the storage device 366 with the function restriction information included in the function restriction notification (S554). Then, the updated function restriction information is transmitted to the application unit 372a registered as the notification target in sequence S530 (S556).

Here, since no key code is included in the vehicle start notification transmitted in sequence S540, the function restriction determination in sequence S544 determines that the vehicle start has been performed with the FOB key 160, and function restriction information indicating "no function restriction" is generated based on the information, which is given in advance, indicating that the user attribute of the key code 150 that the FOB key 160 has is "specified user". Therefore, in sequence S554, the function restriction information stored in the storage device 366 is updated with the function restriction information indicating "no function restriction".

In response to reception of the updated function restriction information, that is, the function restriction information indicating "no function restriction", the application unit 372a cancels the wait message displayed on the display device 360 (S558) and starts normal processing (S560).

On the other hand, when the function restriction notification has not been received from the communication control unit 304 before the elapsed time t passes the predetermined time due to, for example, a load state of the in-vehicle network bus 308, the function restriction applying unit 370 transmits the previous function restriction information stored in the storage device 366, that is, the function restriction information indicating "function restriction applied" to the application unit 372a registered as the notification target in sequence S530 (S562). In response to reception of the function restriction information, the application unit 372a displays the function restriction message, which is changed from the wait message, on the display device 360 and continues the abort of the normal processing (S564).

During the period from a time when the guest user 134 performs the door unlock to a time when the vehicle start is performed through the sequences above, the execution of the application unit 372a in the application execution device 300 is restricted against the guest user 134 who is the user of the vehicle 102 during the period. After the owner 130 performs the vehicle start subsequently, the execution of the application unit 372a in the application execution device 300 is not restricted against the owner 130 who is the subsequent user of the vehicle 102. Even after the owner 130 performs the vehicle start, if application of the function restriction determination in the function restriction determining unit 354 to the application unit 372a delays beyond the predetermined time due to, for example, a load state of the in-vehicle network bus 308, the state of the application function restriction in the application execution device 300 is not changed so that giving a sense of discomfort due to the delay to the owner 130 who is the current user is avoided.

6.2 Second Example

Next, a second example of operations of the vehicle control system 100 in a case where a user who performs door unlock on the vehicle 102 and a user who performs vehicle start on the vehicle 102 are different is described with reference to a sequence diagram shown in FIG. 10.

In this example, first of all, after the owner 130 who is the specified user unlocks a door of the vehicle 102 with the FOB key 160 by using the key code 150 of the FOB key 160, the owner 130 powers on the application execution device 300 and activates the application unit 372a that is the function restriction target app. After the guest user 134 to whom the user ID "Pt-3" is given in the user DB 250 shown in FIG. 4 rides on the vehicle 102, the owner 130 gets off the vehicle 102. After that, the guest user 134 performs the vehicle start by using the key code 154 "VK002" stored in the mobile terminal 144.

Figure 10:
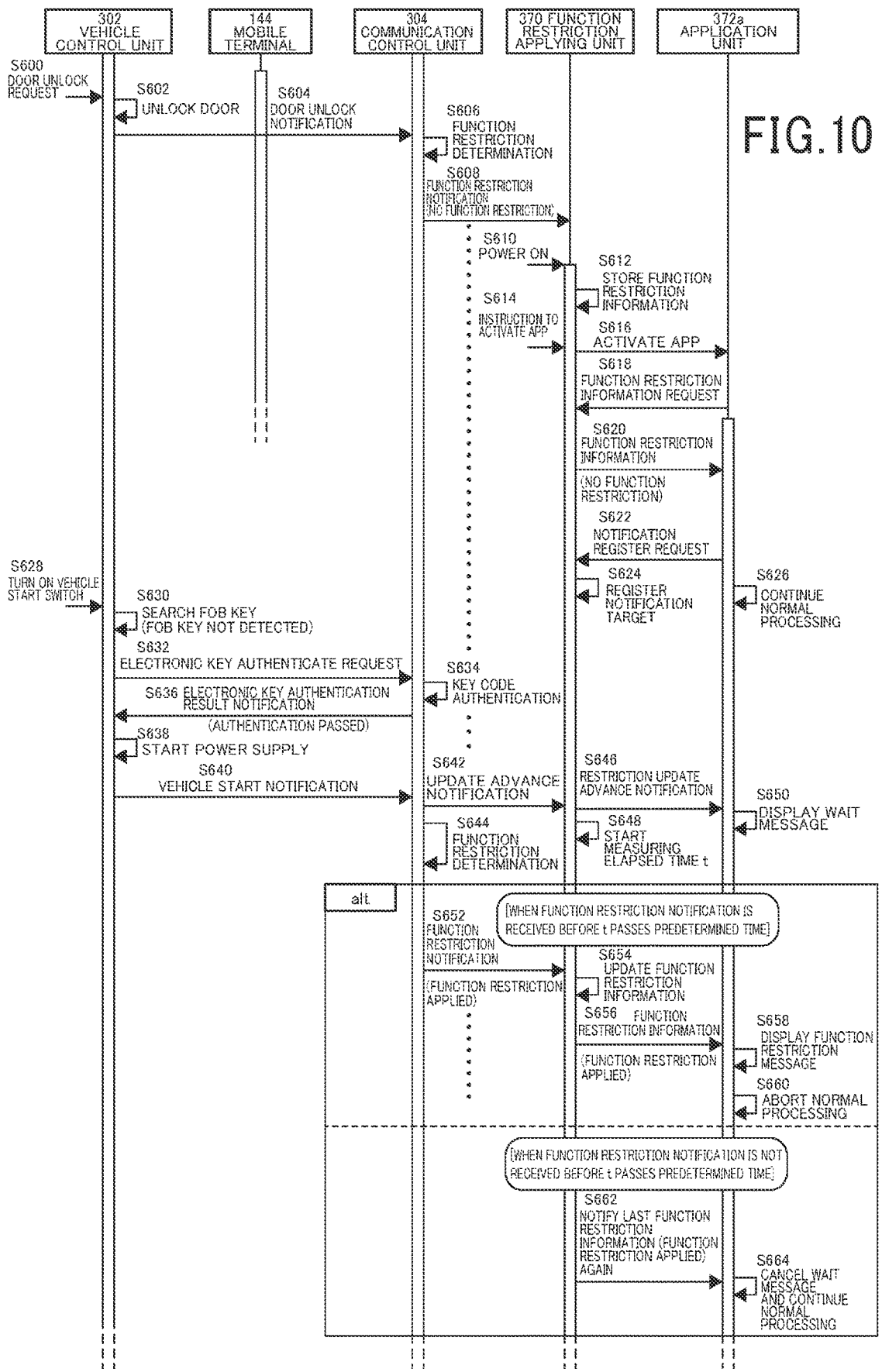
FIG. 10 is a sequence diagram showing a second example of operations in the vehicle control system shown in FIG. 1.

FIG. 10 shows, as objects, the vehicle control unit 302, the mobile terminal 144 of the guest user 134, the communication control unit 304, the function restriction applying unit 370 in the application execution device 300, and the application unit 372a that is the function restriction target app, like FIG. 9. The vehicle control unit 302 and the communication control unit 304 have already been powered on.

When the owner 130 stands in front of a door of the vehicle 102 and transmits a door unlock request from the FOB key 160 to the vehicle 102 (S600), the FOB communication unit 326 in the vehicle control unit 302 compares the key code 150 of the FOB key 160 included in the received door unlock request with the key code for authentication stored in the FOB communication unit 326 and determines that the key code 150 is valid. Then, the FOB communication unit 326 unlocks the door by instructing it to the door lock control unit 330 (S602). Then, the door lock control unit 330 in the vehicle control unit 302 transmits a door unlock notification not including a key code to the communication control unit 304 (S604).

The communication control unit 304 having received the door unlock notification performs the function restriction determination on the door unlock notification as a target by using the function restriction determining unit 354 (S606). Since the door unlock notification does not include a key code, the function restriction determining unit 354 recognizes that the key code used for the door unlock is the key code 150 of the FOB key 160. Then, the function restriction determining unit 354 generates function restriction information indicating "no function restriction" based on the information given in advance that the user attribute associated with the key code 150 is "specified user".

Next, the function restriction determining unit 354 in the communication control unit 304 repeatedly outputs a function restriction notification including the generated function restriction information to the communication device 346. Thus, the function restriction notification is output by the communication device 346 to the in-vehicle network bus 308 (S608). Note that the shown dotted line indicates that the function restriction notification is repeatedly output.

After that, when the application execution device 300 is powered on (S610), the function restriction applying unit 370 in the application execution device 300 starts operating. After the start of operating, the function restriction applying unit 370 receives the function restriction notification repeatedly output by the communication control unit 304 to the in-vehicle network bus 308 and stores the function restriction information included in the received function restriction notification in the storage device 366 (S612).

Further after that, for example, the owner 130 gives an instruction to activate the application unit 372a to the operating device 362 in the application execution device 300 (S614) so that the application unit 372a that is the function restriction target app is activated (S616). The activated application unit 372a transmits a function restriction information request to the function restriction applying unit 370 (S618), and the function restriction applying unit 370 transmits the function restriction information stored in the storage device 366 to the application unit 372a (S620). The application unit 372a further transmits, to the function restriction applying unit 370, a notification register request that requests to register the application unit 372a as a notification target of the function restriction information updated thereafter (S622), and the function restriction applying unit 370 registers the application unit 372a as the notification target (S624).

Next, in response to reception of the function restriction information indicating "no function restriction" transmitted in sequence S620, the application unit 372a continues execution of normal processing (S626) without performing the function restriction.

After a while, the guest user 134 holding the mobile terminal 144 gets into the vehicle 102, and the owner 130 holding the FOB key 160 gets off the vehicle 102 and gives over the vehicle 102 to the guest user 134.

After that, the guest user 134 turns on the vehicle start switch 310 for starting the vehicle 102 (S628). In response to the turning on of the vehicle start switch 310, the FOB communication unit 326 in the vehicle control unit 302 first performs a search for the FOB key 160, but the FOB key 160 is not detected (S630). As a result, the start operation detecting unit 324 in the vehicle control unit 302 transmits an electronic key authenticate request (S632) and requests the communication control unit 304 to authenticate the key code that a mobile terminal existing nearby has.

The communication control unit 304 having received the electronic key authenticate request from the vehicle control unit 302 obtains and performs key authentication processing on the key code 154 from the mobile terminal 144 existing within the interior of the vehicle 102 by using the electronic key authenticating unit 352 (S634). The electronic key authenticating unit 352 refers to the electronic key DB 356 in the storage device 342, discovers, within the electronic key DB 356, electronic key basic information matched with the electronic key basic information "VK002" of the key code 154 of the mobile terminal 144 and transmits an electronic key authentication result notification that the electronic key authentication has passed to the vehicle control unit 302 (S636). In response to reception of the electronic key authentication result notification, the start operation detecting unit 324 in the vehicle control unit 302 instructs the power supply control unit 328 to turn on operations of the power supply system 312 (S638) and transmits a vehicle start notification to the communication control unit 304 (S640).

In response to reception of the vehicle start notification, the function restriction determining unit 354 in the communication control unit 304 transmits an update advance notification to the application execution device 300 (S642) and starts the function restriction determination processing based on the key code 154 included in the vehicle start notification (S644). In response to reception of the update advance notification from the communication control unit 304, the function restriction applying unit 370 in the application execution device 300 transmits a restriction update advance notification to the application unit 372a registered as the notification target in sequence S530 (S646) and starts measuring the elapsed time t from reception of the update advance notification (S648). In response to reception of the restriction update advance notification, the application unit 372a displays the wait message on the display device 360 (S650).

Then, the communication control unit 304 sends out a function restriction notification including the new function restriction information to the in-vehicle network bus 308 by using the function restriction determining unit 354 before the elapsed time t passes the predetermined time (S652), and, when the function restriction applying unit 370 receives this, the function restriction applying unit 370 updates the function restriction information stored in the storage device 366 with the function restriction information included in the function restriction notification (S654). Then, the updated function restriction information is transmitted to the application unit 372a registered as the notification target in sequence S624 (S656).

Here, since the key code included in the vehicle start notification transmitted in sequence S640 is the key code 154 of the mobile terminal 144 associated with the user attribute "unspecified user", function restriction information indicating "function restriction applied" is generated in the function restriction determination in sequence S644. Therefore, in sequence S654, the function restriction information stored in the storage device 366 is updated with the function restriction information indicating "function restriction applied".

In response to reception of the updated function restriction information, that is, the function restriction information indicating "function restriction applied", the application unit 372a displays the function restriction message on the display device 360 (S658) and aborts normal processing (S660).

On the other hand, when the function restriction notification is not received from the communication control unit 304 before the elapsed time t passes the predetermined time due to, for example, a load state of the in-vehicle network bus 308, the function restriction applying unit 370 transmits the previous function restriction information stored in the storage device 366, that is, the function restriction information indicating "no function restriction" to the application unit 372a registered as the notification target in sequence S624 (S662). In response to reception of the function restriction information, the application unit 372a cancels the display of the wait message on the display device 360 and continues normal processing (S664).

Through the sequences above, during a period from a time when the owner 130 performs door unlock to a time when vehicle start is performed, execution of an application in the application execution device 300 is not restricted against the owner 130 who is a user of the vehicle 102 in the period. Then, after the guest user 134 starts the vehicle 102, the function restriction on the application unit 372a is performed in the application execution device 300 against the guest user 134 who is the subsequent user of the vehicle 102. Even after the guest user 134 performs the vehicle start, if application of the function restriction determination in the function restriction determining unit 354 to the application unit 372a delays beyond a predetermined time due to, for example, a load state of the in-vehicle network bus 308, giving a sense of discomfort because of the delay to the guest user 134 who is the current user is avoided, without changing the state of the application function restriction in the application execution device 300.

7. Overview

As described above, the vehicle control system 100 according to this embodiment includes the processing device 364 provided in the vehicle 102 which can be used by using each of, for example, the plurality of electronic keys 150, and the application units 372a and 372b implemented by execution of application programs by the processing device 364. The vehicle control system 100 further includes the function restriction determining unit 354 determining whether function restriction on the application unit 372a being a function restriction target is to be performed or not based on a key code of, for example, the electronic key 150 used for the vehicle 102. The vehicle control system 100 further includes the function restriction applying unit 370 instructing, for example, the application unit 372a to apply function restriction information that is a determination result in the function restriction determining unit 354.

The function restriction determining unit 354 determines whether the function restriction on the application unit 372a being the function restriction target app is to be performed or not based on a key code of the used electronic key at a plurality of predetermined times when one of, for example, the electronic keys 150 is used during a period from start of use of the vehicle 102 to end of the use. The function restriction applying unit 370 transmits the function restriction information to the application unit 372a and instructs to apply the determination result in the function restriction determining unit 354 upon activation of the application unit 372a and when a function restriction notification that is a notification of the determination result is received from the function restriction determining unit 354 after the activation.

With this configuration, functions to be provided to a user by the application execution device 300 through execution of the application unit 372a can be automatically restricted in accordance with the current user of the vehicle 102 without performing a special key operation by the user and without causing an increase of a processing load on an in-vehicle device such as the application execution device 300, the vehicle control unit 302 and the communication control unit 304.

In the vehicle control system 100, upon activation of the application unit 372a, the application unit 372a transmits, to the function restriction applying unit 370, a notification request that instructs to transmit, to the application unit 372a, function restriction information that is an instruction to apply the determination result when the function restriction applying unit 370 receives a function restriction notification that is a notification of the determination result from the function restriction determining unit 354 after activation of the application unit 372a.

With this configuration, since, in a case where, for example, a plurality of application units are activated, the function restriction applying unit 370 is required to transmit a subsequently received function restriction notification only to the application unit having transmitted the notification request, without transmitting it to all of the application units, the application function restriction can be continued without causing an increase of a processing load.

In the vehicle control system 100, the function restriction determining unit 354 determines whether the function restriction on the application unit 372a is to be performed or not based on whether a person holding, for example, the electronic key 150 used for the vehicle 102 is a specified user being the owner 130 of the vehicle 102 or a person having a predetermined relationship with the owner 130 or an unspecified user other than the specified user.

With this configuration, since whether the application function restriction is to be performed or not is determined in accordance with whether the user is the specified user or the unspecified user, the function restriction determining unit 354 can perform the application function restriction according to the user of the vehicle 102 without performing complicated determination and, therefore, without increasing a processing load.

Furthermore, in the vehicle control system 100, each key code of, for example, the electronic key 152 of, for example, the family user 132, except for the electronic key 150 of the FOB key 160 owned by the owner 130, includes information indicating whether the person holding the electronic key is the specified user or the unspecified user. With this configuration, since the function restriction determining unit 354 can determine whether the user of the key code is the specified user or the unspecified user based on the key code itself, the processing load can be reduced.

In the vehicle control system 100, the predetermined times include a time when a door of the vehicle 102 is unlocked by using one of, for example, the plurality of electronic keys 150. With this configuration, based on the key code used for the door unlock being the initial step for the vehicle use, application function restriction according to the user who starts using the vehicle can be started first.

Still further, in the vehicle control system 100, the predetermined times include a time when one of, for example, the plurality of electronic keys 150 is used for starting the vehicle 102. With this configuration, when a period of driving of the vehicle 102 is started, the application function restriction is switched in accordance with a user planned to perform the driving, or application restriction according to the user can be started.

In the vehicle control system 100, the function restriction applying unit 370 measures an elapsed time t from start of the vehicle 102 and, if a determination result is not received from the function restriction determining unit 354 before the elapsed time t passes a predetermined time, instructs the application unit 372a to apply a determination result in the function restriction determining unit 354 received before the start of the vehicle 102.

With this configuration, a sense of discomfort given to the user because reflection, to the application unit 372a, of a result of determination on whether the application function restriction is to be performed or not in the function restriction determining unit 354, which is performed upon start of the vehicle, is delayed beyond a time normally required for the determination can be prevented.

Furthermore, in the vehicle control system 100, the application unit 372a instructed to apply function restriction information that is a result of the determination in the function restriction determining unit 354 by the function restriction applying unit 370 includes a content for which charges may be incurred or a content regarding personal information on the specified user. With this configuration, occurrence of inconvenience such as a case where a content involving charging is used by, for example, the guest user 134 who is the unspecified user, and the owner 130 is billed can be prevented.

Also, in the vehicle control system 100, the function restriction applying unit 370 is included in a part of an operating system executed by the processing device 364, middleware existing between the operating system and the application units 372a and 372b, or a background application executed on the operating system.

With this configuration, since the function restriction applying unit 370 can be implemented by using a standard operating system, without changing the operating system itself, the vehicle control system 100 can be implemented easily and inexpensively.

8. Modification Example

The present invention is not limited to the configuration of the above-described embodiment but can be implemented in various aspects without departing from the spirit and scope of the present invention.

For example, having described that the use management server 106 generates a key code including user attribute information and, with respect to a key code issued by the use management server 106, the function restriction determining unit 354 obtains a user attribute from the key code, the present invention is not limited thereto. For example, the use management server 106 may issue an electronic key including only electronic key basic information, and the function restriction determining unit 354 may inquire the use management server 106 about a user attribute associated with a key code included in the door unlock notification or the vehicle start notification. The use management server 106 can refer to the user DB 250 and transmit the user attribute associated with the key code relating to the inquiry to the vehicle 102.

Having described that, according to the above-described embodiment, the vehicle control system 100 restricts execution of the entire application unit 372a that is the function restriction target app in the application execution device 300 based on the function restriction information generated by the function restriction determining unit 354, the present invention is not limited thereto. For example, execution of a part of functions of the application unit 372a that is the function restriction target app may be restricted based on the function restriction information generated by the function restriction determining unit 354. In this case, it can be assumed that which function is to be restricted is described in an application program that implements the application unit 372a.

Having described that, according to the above-described embodiment, the function restriction message and/or the wait message is/are displayed on the display device 360 when the application unit 372a receives the function restriction information, the present invention is not limited thereto. Instead of or in addition to this, under a condition that a user clicks or touches an icon representing the application unit 372a displayed on the display device 360, the application unit 372a may display the function restriction message or the wait message on the display device 360 based on the function restriction information received before that.

In a case where the FOB key 160 and, for example, the mobile terminal 142 or, for example, a plurality of mobile terminals 142 exist within a communicable range with the vehicle 102, a stage may be provided for placing the FOB key 160 and/or, for example, the mobile terminal 142 to be used for start such that which device (the FOB key or one of the mobile terminals) has been used for the vehicle start can be identified. In this case, an antenna of the wireless device 322 in the vehicle control unit 302 and an antenna of the wireless device 344 in the communication control unit 304 are provided in vicinity of the stage, and the wireless devices 322 and 344 perform extremely short-range communication so that a key code used for the vehicle start can be obtained from the FOB key 160 or, for example, the mobile terminal 142 placed on the stage.

REFERENCE SIGNS LIST

100: vehicle control system, 102: vehicle, 104: network, 106: use management server; 120: in-vehicle system, 130: owner, 132: family user, 134, 136: guest user, 140, 142, 144, 146: mobile terminal, 150, 152, 154, 156: electronic key (key code), 160: FOB key, 200, 320, 340, 364: processing device, 202, 342, 366: storage device, 204, 323, 346, 368: communication device, 220: user management unit, 222: electronic key issuing unit, 250: user DB, 300: application execution device, 302: vehicle control unit, 304: communication control unit, 306: telemetry control unit (TCU), 308: in-vehicle network bus, 310: vehicle start switch, 312: power supply system, 314: door lock mechanism, 322, 344: wireless device, 324: start operation detecting unit, 326: FOB communication unit, 328: power supply control unit, 330: door lock control unit, 350: door operation receiving unit, 352: electronic key authenticating unit, 354: function restriction determining unit, 360: display device, 362: operating device, 370: function restriction applying unit, 372a, 372b: application unit

The invention claimed is:

1. A vehicle control system comprising a processor provided in a vehicle which can be used by using each of a plurality of electronic keys, wherein the processor comprises:
a communication control unit for controlling communication between each mobile terminal of a plurality of users;
an electronic key issuing unit generating the plurality of electronic keys, each of the plurality of electronic keys including information on an attribute of each of the plurality of users, and the electronic key issuing unit transmitting the generated plurality of electronic keys to the respective mobile terminals of the plurality of users;
an application unit implemented by execution of an application program by the processor;
a door lock control unit that, when an instruction to unlock a door lock of the vehicle by one electronic key of the plurality of electronic keys is received, causes a door lock mechanism to operate to unlock the door lock, and transmits a door unlock notification for notifying the door lock is unlocked;
a function restriction determining unit that, when the door lock is unlocked after receiving the instruction to unlock the door of the vehicle, determines whether function restriction on the application unit is to be performed or not based on a key code of the one electronic key; and
a function restriction applying unit instructing the application unit to apply a determination result of the function restriction determining unit,
wherein
the vehicle control system further comprises a memory for storing the determination result of the function restriction determining unit,
the function restriction determining unit determines whether the function restriction on the application unit is to be performed or not based on the key code of the one electronic key during a period from when the door unlock notification is received to when the door lock of the vehicle of which a vehicle start switch is in an OFF state and on which there is no passengers is unlocked,
the function restriction applying unit instructs the application unit to apply the determination result of the function restriction determining unit upon activation of the application unit and when a notification of the determination result is received from the function restriction determining unit after the activation, and
the function restriction applying unit measures an elapsed time from when the door unlock notification is received, and if a new determination result is not received from the function restriction determining unit during a predetermined elapsed time, instructs the application unit to apply the determination result stored in the memory.

2. The vehicle control system according to claim 1, wherein, upon activation of the application unit, the application unit transmits, to the function restriction applying unit, a notification request that instructs to transmit, to the application unit, an instruction to apply the determination result when the function restriction applying unit receives a notification of the determination result from the function restriction determining unit after activation of the application unit.

3. The vehicle control system according to claim 1, wherein the function restriction determining unit determines whether the function restriction on the application unit is to be performed or not based on whether a person holding the one electronic key is a specified user including an owner of the vehicle or a person having a predetermined relationship with the owner or an unspecified user other than the specified user.

4. The vehicle control system according to claim 3, wherein the key code of at least one of the electronic keys includes information indicating whether the person holding the electronic key is the specified user or the unspecified user.

5. The vehicle control system according to claim 3, wherein the application unit instructed to apply the determination result in the function restriction determining unit by the function restriction applying unit includes a content for which charges may be incurred or a content regarding personal information on a specified user including an owner of the vehicle or a person having a predetermined relationship with the owner.

6. The vehicle control system according to claim 1, wherein the function restriction applying unit is included in a part of an operating system executed by the processor, middleware existing between the operating system and the application unit, or a background application executed on the operating system.

\* \* \* \* \*